(12) United States Patent
Niles et al.

(10) Patent No.: US 7,805,678 B1
(45) Date of Patent: Sep. 28, 2010

(54) EDITING WITHIN SINGLE TIMELINE

(75) Inventors: Gregory Niles, Marina del Ray, CA (US); John G. Foster, Santa Monica, CA (US); Charles Migos, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 863 days.

(21) Appl. No.: 10/826,429

(22) Filed: Apr. 16, 2004

(51) Int. Cl.
G06F 3/00 (2006.01)
(52) U.S. Cl. .................. 715/716; 715/723; 715/726
(58) Field of Classification Search .............. 715/716, 715/726, 723
See application file for complete search history.

(56) References Cited

U.S. PATENT DOCUMENTS

| | | | | |
|---|---|---|---|---|
| 5,467,288 | A * | 11/1995 | Fasciano et al. | ............. 715/716 |
| 5,588,098 | A | 12/1996 | Chen et al. | |
| 5,717,848 | A | 2/1998 | Watanabe et al. | |
| 5,731,819 | A | 3/1998 | Gagne et al. | |
| 5,781,188 | A | 7/1998 | Amiot et al. | |
| 5,835,692 | A | 11/1998 | Cragun et al. | |
| 5,835,693 | A | 11/1998 | Lynch et al. | |
| 5,883,639 | A | 3/1999 | Walton et al. | |
| 6,011,562 | A | 1/2000 | Gagne et al. | |
| 6,045,446 | A | 4/2000 | Ohshima | |
| 6,154,601 | A | 11/2000 | Yaegashi et al. | |
| 6,266,053 | B1 | 7/2001 | French et al. | |
| 6,310,621 | B1 | 10/2001 | Gagne et al. | |
| 6,353,437 | B1 | 3/2002 | Gagne | |
| 6,525,736 | B1 | 2/2003 | Erikawa et al. | |
| 6,544,294 | B1 * | 4/2003 | Greenfield et al. | .......... 715/234 |
| 6,664,986 | B1 | 12/2003 | Kopelman et al. | |
| 6,714,201 | B1 | 3/2004 | Grinstein et al. | |
| 6,727,919 | B1 * | 4/2004 | Reder et al. | ................. 715/810 |
| 6,756,984 | B1 | 6/2004 | Miyagawa | |
| 7,055,168 | B1 | 5/2006 | Errico et al. | |
| 7,073,127 | B2 * | 7/2006 | Zhao et al. | ................... 715/719 |
| 7,124,366 | B2 * | 10/2006 | Foreman et al. | ............. 715/719 |
| 2001/0030647 | A1 | 10/2001 | Sowizral et al. | |
| 2001/0036356 | A1 * | 11/2001 | Weaver et al. | .................. 386/52 |
| 2001/0040592 | A1 * | 11/2001 | Foreman et al. | ............. 345/723 |
| 2002/0112180 | A1 | 8/2002 | Land et al. | |
| 2003/0043191 | A1 | 3/2003 | Tinsley et al. | |
| 2004/0036711 | A1 | 2/2004 | Anderson | |
| 2004/0039934 | A1 | 2/2004 | Land et al. | |
| 2005/0110964 | A1 | 5/2005 | Bell et al. | |
| 2005/0231512 | A1 | 10/2005 | Niles et al. | |

OTHER PUBLICATIONS

Wohl, Michael. "Editing Techniques with Final Cut Pro". Published Oct. 22, 2001.*

(Continued)

*Primary Examiner*—Kieu Vu
*Assistant Examiner*—Omar Abdul-Ali
(74) *Attorney, Agent, or Firm*—Fenwick & West LLP

(57) ABSTRACT

Video clips are depicted both in an overall layer and in a set of individual tracks, or rows. The user can cause the display to be expanded or collapsed, as desired, so as to reveal or hide the individual tracks. Video clips are fully editable in either the expanded or collapsed viewing modes. When the collapsed mode is in effect, bars representing individual video clips are still visible, and can be individually selected and manipulated. When the expanded mode is in effect, separate tracks are shown for each individual clip, but the overall layer remains visible, and the individual video clips also remain visible, selectable, and manipulable within the overall layer.

48 Claims, 23 Drawing Sheets

OTHER PUBLICATIONS

Robuck, Steven. "Pro Tools 5 for Macintosh and Windows Visual Quickstart Guide". Published Jun. 24, 2002.*

Brenneis, Lisa. "Final Cut Pro 3 for Macintosh: Visual QuickPro Guide". Published Apr. 3, 2002.*

* cited by examiner

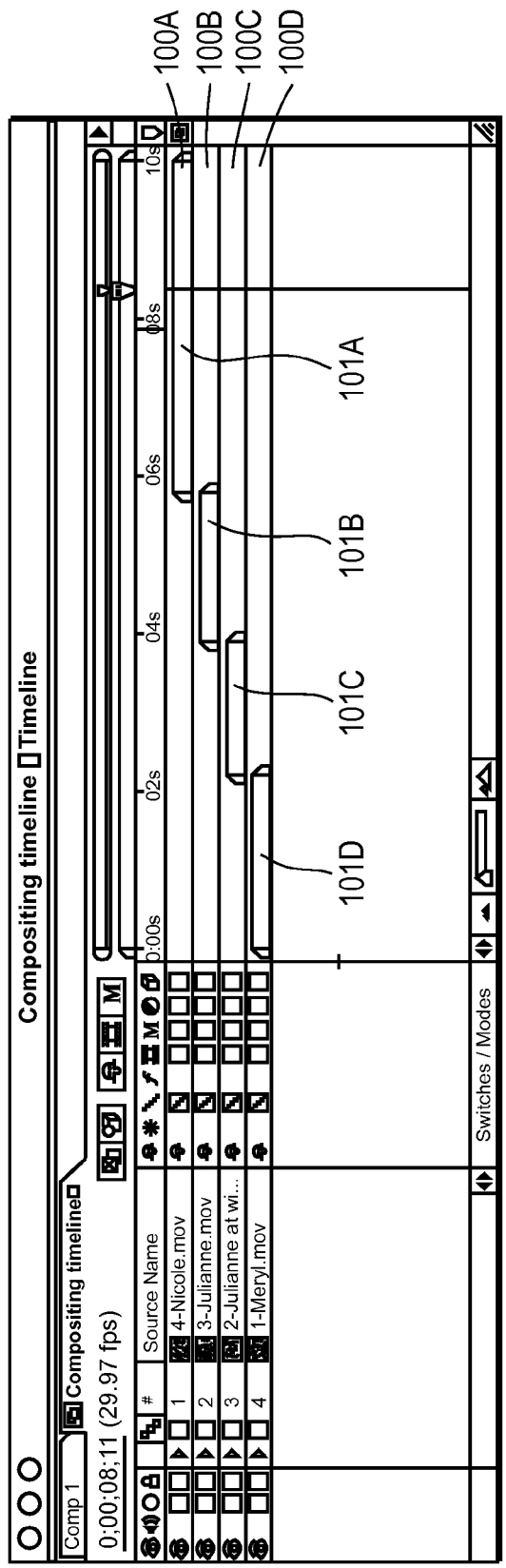
FIG. 2A *(PRIOR ART)*

EDITING WITHIN SINGLE TIMELINE

CROSS-REFERENCE TO RELATED APPLICATIONS

This application is related to the following commonly owned and co-pending U.S. patent applications, the disclosures of which are incorporated herein by reference:

U.S. patent application Ser. No. 10/826,973 for "Animation of an Object Using Behaviors", filed Apr. 16, 2004.

U.S. patent application Ser. No. 10/826,878 for "Gesture Control of Multimedia Editing Applications", filed Apr. 16, 2004.

BACKGROUND OF THE INVENTION

1. Field of the Invention

The present invention relates generally to user interfaces for video editing applications, and more particularly to a user interface that provides expandable and collapsible layers for organizing, viewing, and manipulating a video project.

2. Background of the Invention

Most video editing software applications provide some sort of timeline view of the video project. Conventionally, a timeline view is a graphical representation showing a number of video clips and their arrangement within the video project. For example, a horizontal timeline may be established, with each video clip being represented by a horizontal bar that provides a visual indication of the start and end points of each clip within a time axis. A user can manipulate the horizontal bar to shorten, lengthen, move, or edit the video clip.

In most video editing programs, such as Final Cut Pro, available from Apple Computer Corp. of Cupertino, Calif., clips are depicted on a single horizontal row; an example of such an arrangement is shown in FIG. 1A. Row 100 includes bars representing four clips 101A through 101D. The user can drag clips 101A through 101D to move them to other locations within the timeline represented by row 100.

Such an approach, which is common in most video editing programs, makes it difficult to distinguish between overlapping clips and sequentially arranged clips. Since all clips are shown on row 100, overlapping (such as for example if one clip fades into another, or if clips are superimposed upon one another) is not immediately visible from the timeline. In addition, in cases where clips are superimposed on one another, so that they occupy a common location in row 100, one clip 101 may be obscured from view if it is hidden underneath another clip 101 within row 100. If a large number of superimposed clips are provided, the arrangement of FIG. 1A can make it difficult to view and manipulate clips 101, or to understand the relationship among the clips 101, or even to see which clips 101 are present.

Programs such as Final Cut Pro allow nesting of clips 101 into a single aggregated timeline bar 201, as shown in FIG. 1B. Timeline bar 201 represents the four clips 101A through 101D that were shown in FIG. 1A. If the user wishes to edit individual clips 101A through 101D when timeline bar 201 is displayed, the user must expand bar 201 (typically by double-clicking on it) to return to a screen similar to FIG. 1A, which allows individual clips 101A through 101D to be manipulated and/or edited. Thus, although timeline bar 201 offers a more streamlined view of the video project, it does not allow for direct editing of its component clips 101, forcing the user to switch between views in order to perform editing operations.

Other software applications, particularly compositing applications such as After Effects, available from Adobe Corp. of San Jose, Calif., provide multiple rows for displaying video clips within a timeline; an example of such an arrangement is shown in FIG. 2A. Here, a separate row 100A through 100D is provided for each clip 101A through 101D. In general, each clip 101 is displayed in its own horizontal row 100. Such an arrangement more clearly shows the relationships among clips 101, and in particular shows distinctions between overlapping clips 101 and sequential clips 101. However, such an arrangement can become cumbersome when, for example, the video project includes a large number of clips 101 in sequence; the timeline display can become excessively deep in the vertical direction, since a separate row 100 is generated for each clip 101.

Programs such as After Effects allow clips 101 to be collapsed into a single aggregated timeline bar 201, as shown in FIG. 2B. This timeline bar 201 is referred to as a "nest." However, as with the technique depicted in FIG. 1B, such an arrangement does not provide any indication of the contents of bar 201, and does not provide any mechanism for directly editing those contents. In order to edit individual clips 101, the user must expand timeline bar 201 (typically by double-clicking on it) to return to a screen similar to FIG. 2A, which allows individual clips 101A through 101D to be manipulated and/or edited.

The user can click on expand button 401 to show a screen similar to FIG. 2C, which allows editing of certain properties of timeline bar 201. However, as shown in FIG. 2C, the only properties that can be edited are master attributes 501 such as global position, scale, rotation, and the like. No provision is made for editing individual clips 101 of bar 201 without first expanding bar 201 to display a screen such as FIG. 2A.

Some programs, such as Combustion, available from Discreet of Montreal, Quebec, Canada, provide a display that includes both an aggregated timeline bar 201 and separate rows for displaying clips 101A through 101D. An example of such a display is shown in FIG. 3A. Clips 101A through 101D can be collapsed into bar 201, resulting in a display such as shown in FIG. 2B. Here, as in the previously discussed prior art examples, the collapsed bar 201, whether shown together with separately displayed clips 101A through 101D as in FIG. 2A or on its own as in FIG. 2B, does not permit direct editing of clips 101. Thus, as with the previous examples of prior art techniques, there is no way for the user to directly edit individual clips 101A through 101D within bar 201.

What is needed is a technique that combines the benefits of a single timeline bar with those of the multiple-row approach, while avoiding the detrimental aspects of each technique. What is further needed is a user interface that provides a single-bar view of a number of clips on a single horizontal row while still allowing direct editing of clips within the row. What is further needed is a user interface that provides maximum visibility, control, and manipulability of video clips without occupying excessive screen space and without forcing the user to switch between collapsed and expanded modes.

SUMMARY OF THE INVENTION

The present invention combines the benefits of a single-row timeline with those of the multiple-row approach. Video clips are depicted both in an overall layer and in a set of individual tracks. The user can cause the display to be expanded or collapsed, as desired, so as to reveal or hide the individual tracks. Video clips are fully editable in both the expanded and collapsed viewing modes. When the collapsed mode is in effect, bars representing individual video clips are still visible, and can be individually selected and manipulated. When the expanded mode is in effect, separate tracks are shown for each individual clip, but the overall layer remains visible, and the individual video clips also remain visible, selectable, and manipulable within the overall layer.

In addition, in one embodiment, the present invention provides a miniature version of a timeline associated with a displayed video clip. The miniature timeline is automatically activated (or displayed) when the user selects an object having a temporal component (such as a video clip, behavior, or object). The user is able to perform some subset of operations that would normally be available for objects in a timeline. The miniature timeline is automatically deactivated (or hidden) when the corresponding on-screen object is deselected or deleted, or when it no longer appears on the screen. In one embodiment, two or more miniature timelines may be simultaneously displayed when two or more objects having temporal components are selected.

BRIEF DESCRIPTION OF THE DRAWINGS

The accompanying drawings illustrate several embodiments of the invention and, together with the description, serve to explain the principles of the invention.

FIG. 2A is a screen shot showing an example of a timeline for a compositing application, including separate rows for each video clip, according to the prior art.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In one embodiment, the present invention is implemented as part of a software application for video editing and/or video compositing. The software application is installed on a personal computer such as a Macintosh personal computer running the MacOS X operating system. The personal computer includes a processor, memory, input devices such as keyboard and mouse, and an output device such as a display screen. These components are not illustrated herein as they are well-known hardware components commonly used for running software applications. In one embodiment, software embodying the invention is provided on a computer-readable medium such as a disk.

For illustrative purposes, the invention is described herein in the context of editing video clips. However, one skilled in the art will recognize that the techniques of the present invention can be embodied in any software application for editing media clips of any type, and is not limited to video editing.

Figure 1A:
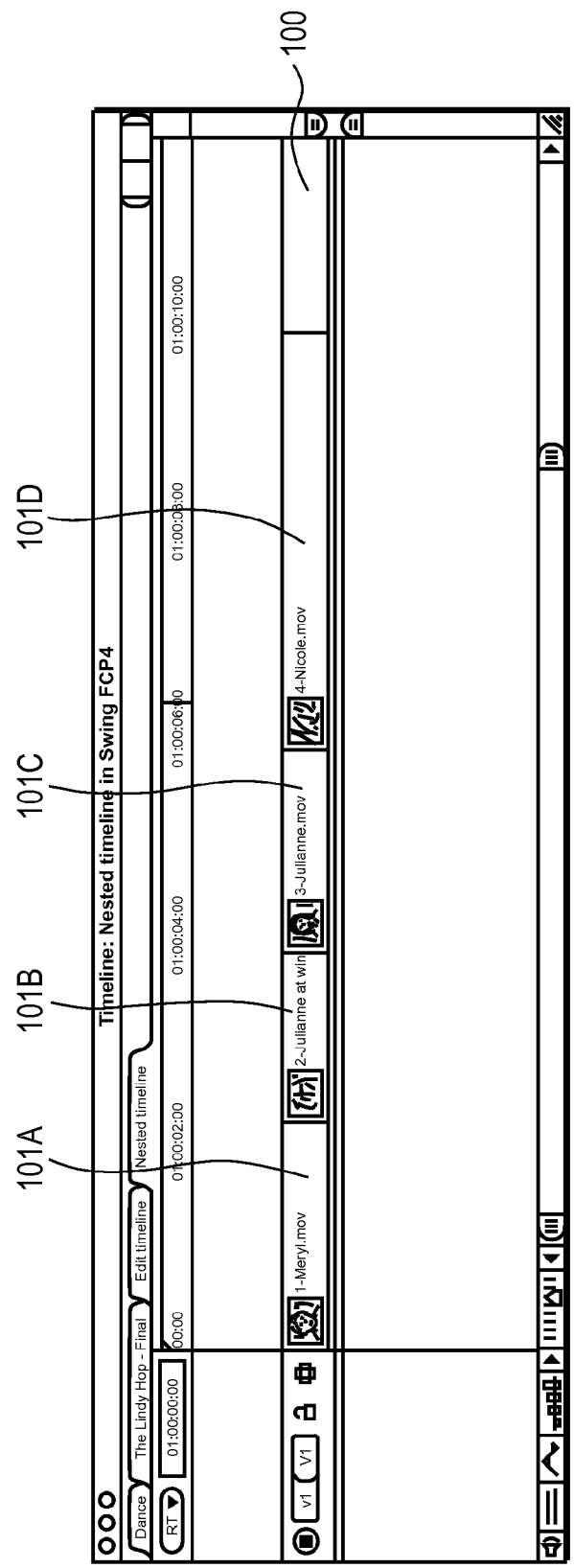
FIG. 1A is a screen shot showing an example of a timeline for a video editing application, including a single row for video clips, according to the prior art.
Figure 1B:
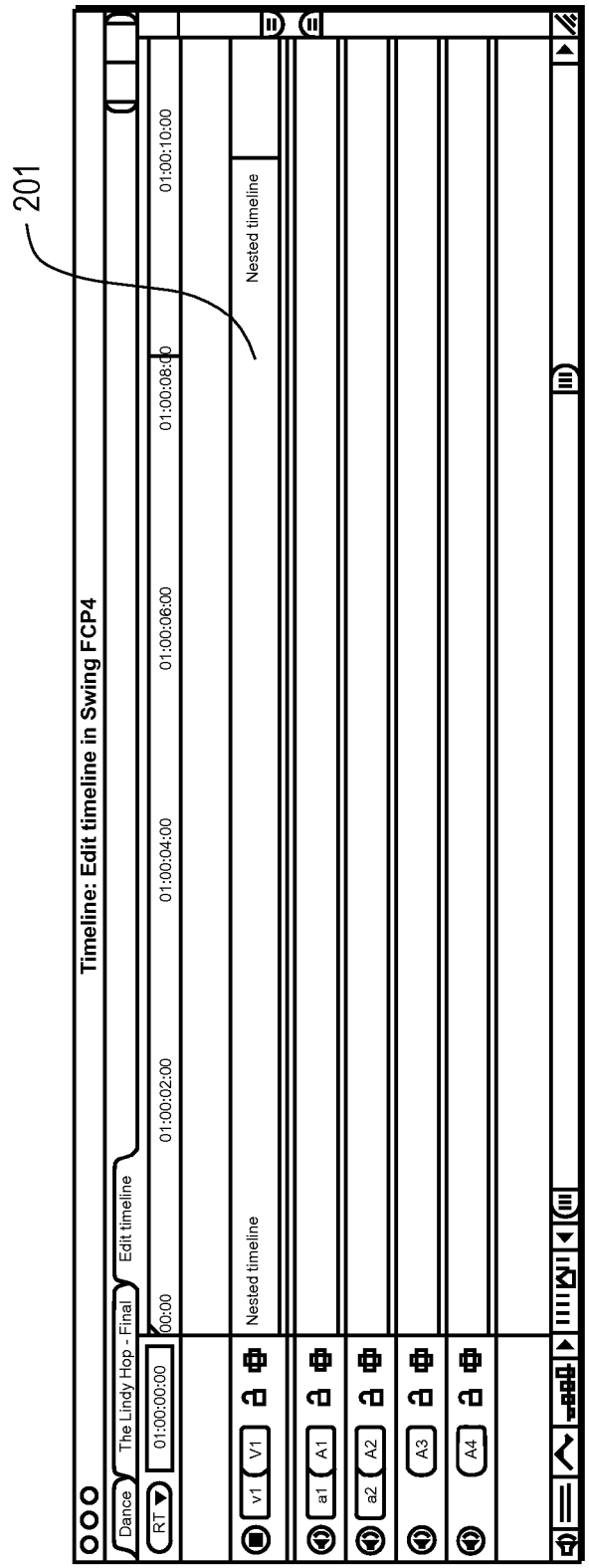
FIG. 1B is a screen shot showing an example of a timeline for a video editing application, including nested video clips, according to the prior art.
Figure 2B:
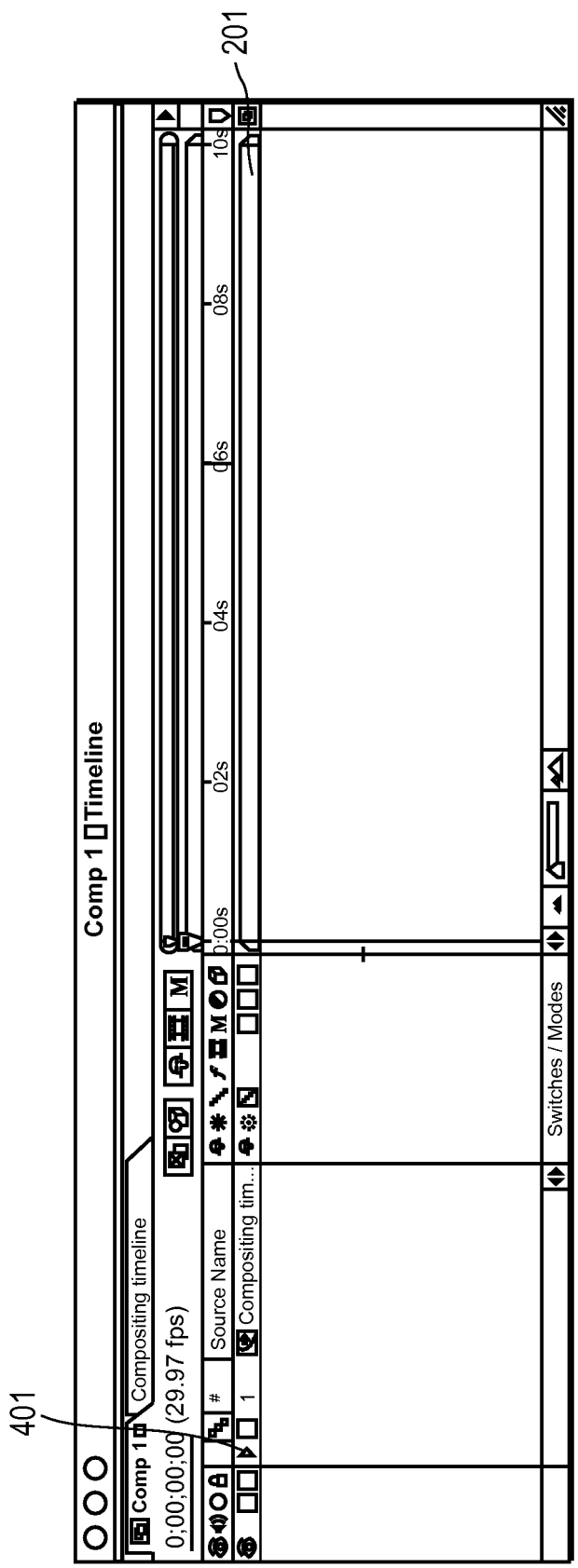
FIG. 2B is a screen shot showing an example of a timeline for a compositing application, including nested for each video clip, according to the prior art.
Figure 2C:
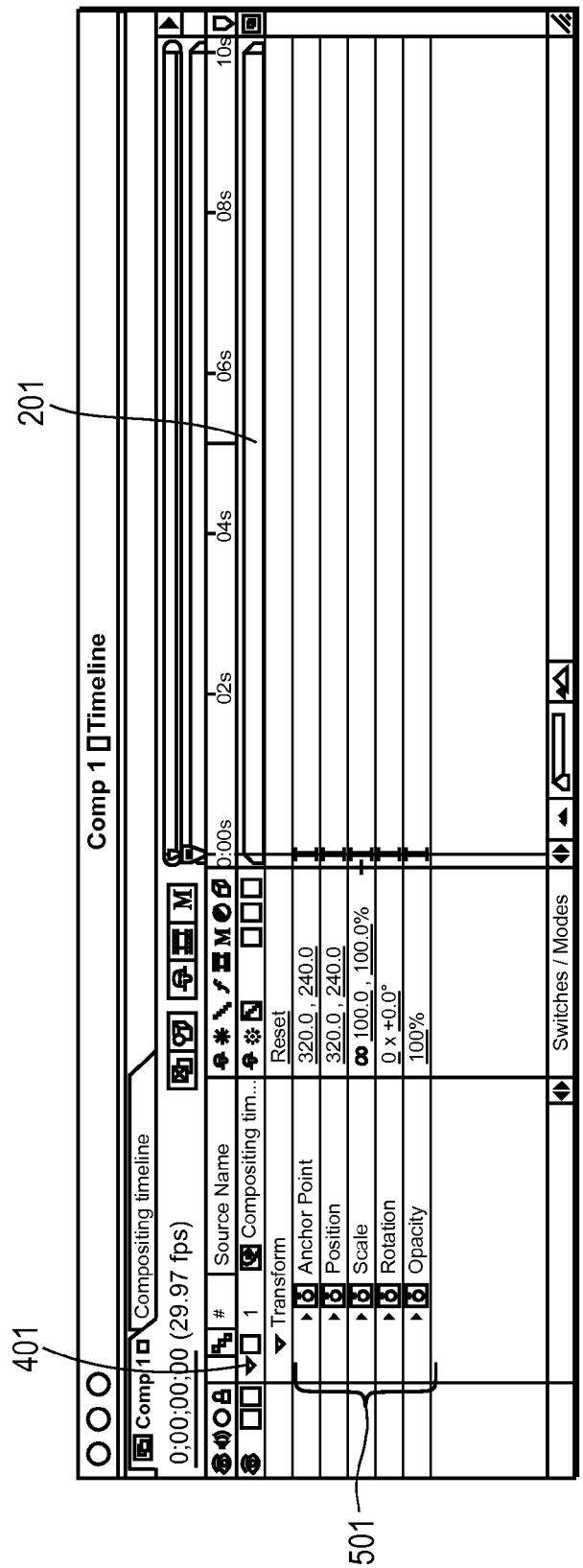
FIG. 2C is a screen shot showing an example of a timeline for a compositing application, including editable parameters, according to the prior art.
Figure 3A:
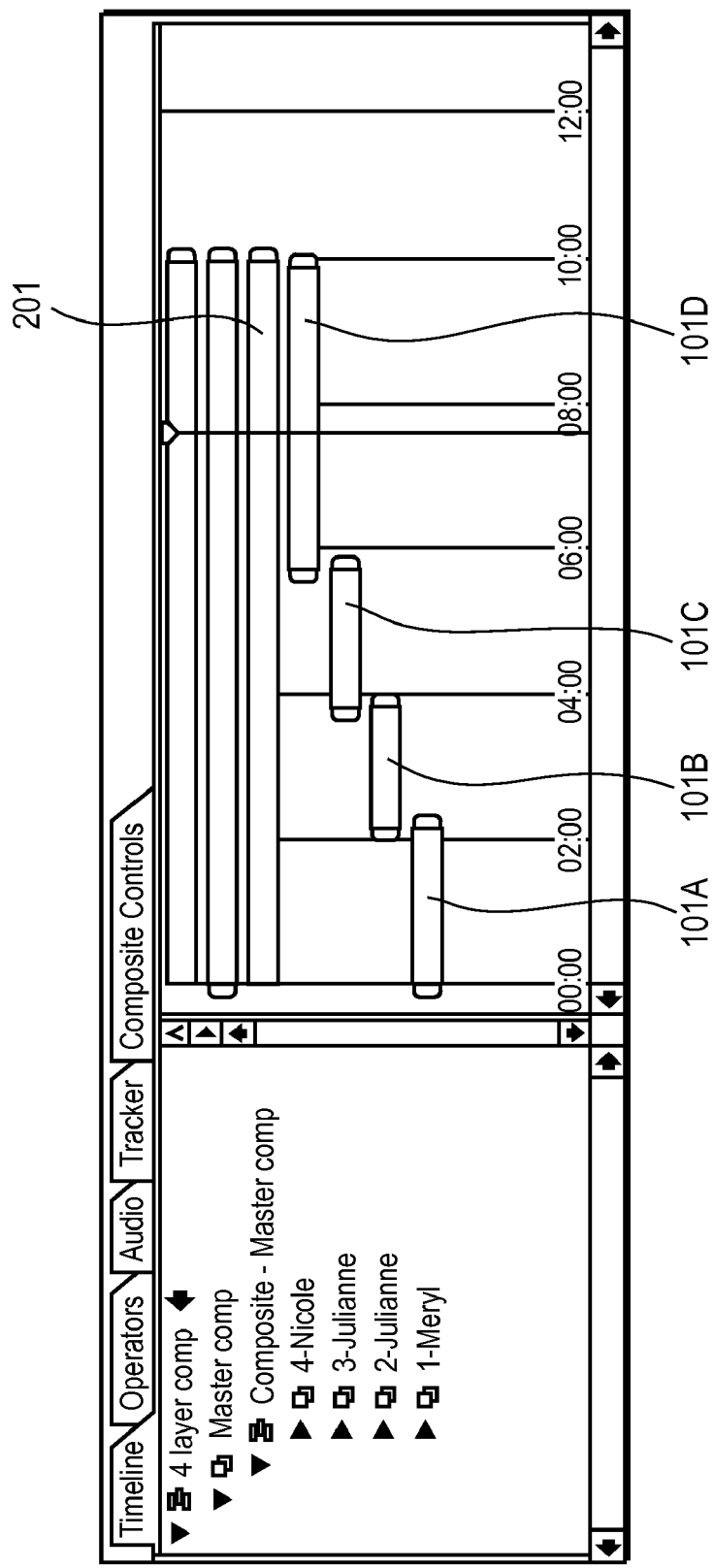
FIG. 3A is a screen shot showing an example of a timeline for a compositing application, including separate rows for each video clip and a separate non-editable row representing an overall video clip, according to the prior art.
Figure 3B:
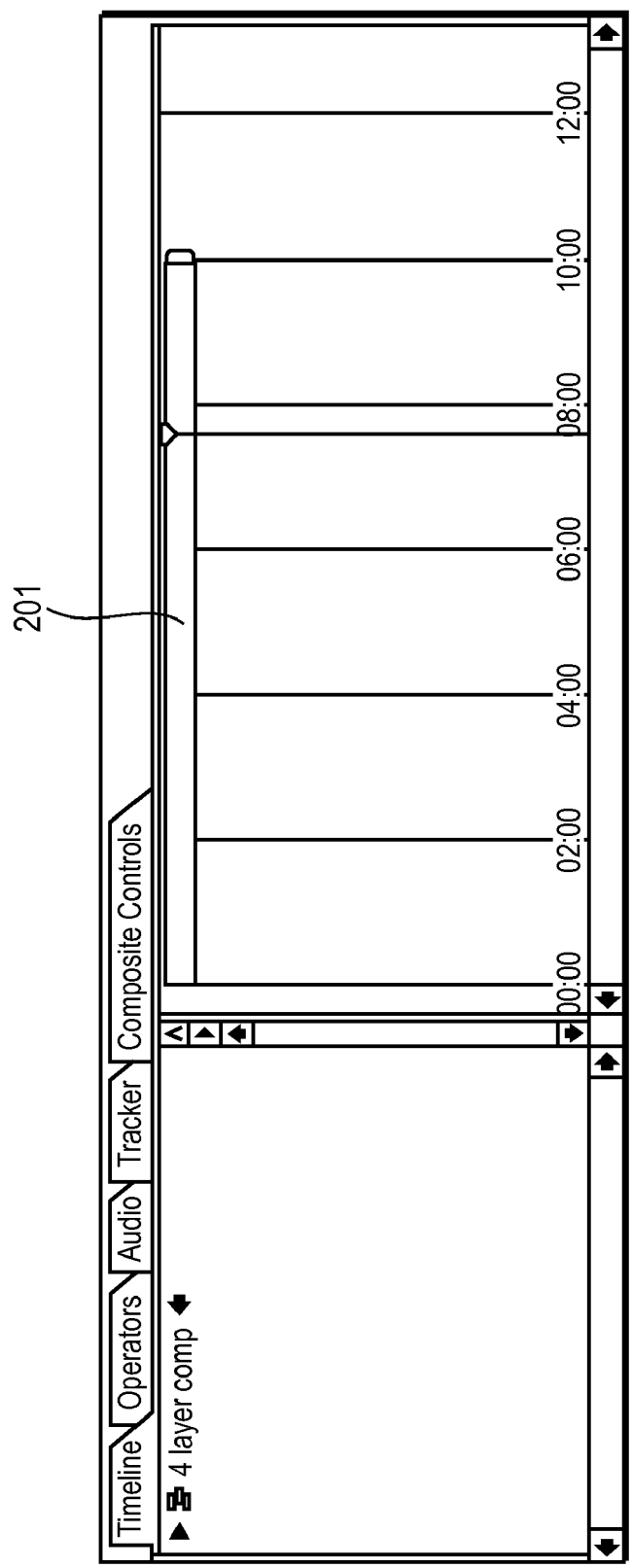
FIG. 3B is a screen shot showing an example of a timeline for a compositing application, including a non-editable row representing an overall video clip, according to the prior art.
Figure 4:
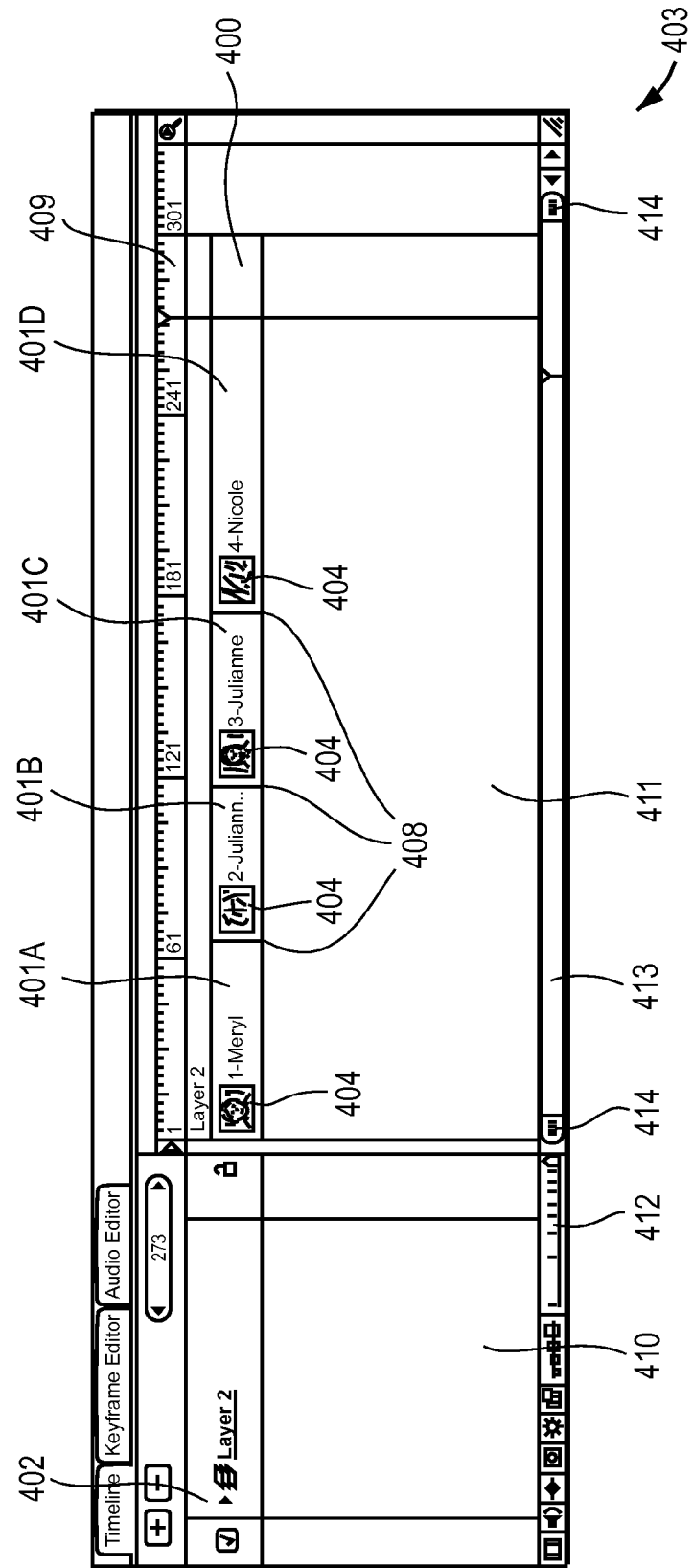
FIG. 4 is a screen shot showing an example of a timeline display having a single layer including four video clips, according to an embodiment of the present invention.

Referring now to FIG. 4, there is shown a screen shot depicting an example of a timeline display 403 having a single layer 400 including four video clips 401A through 401D, according to an embodiment of the present invention. In one embodiment, display 403 is accompanied by a canvas (not shown in FIG. 4), which is a display showing video clips 401 and their relative spatial positions in the overall video project, where applicable. Timeline display 403 provides an overview of the entire video project and its temporal arrangement. By manipulating the various elements of display 403, the user can organize clips 401 and other objects (such as effects, transitions, titles, and the like) to begin and end on the frames selected by the user. The user can also align multiple objects so that they occur simultaneously. The user can control objects' durations and perform common trim operations to edit the objects according to well-known video editing techniques.

In one embodiment, additional controls (not shown) allow the user to manipulate masks, filters, behaviors, keyframes, and audio elements along with video clips 401. Time ruler 409 provides an exact reference for managing timing and synchronizing effects and objects. The user can lock tracks and layers to prevent changes, temporarily hide objects from view, and manage links between audio and video.

In one embodiment, timeline display 403 includes layer list 410 and time graph 411. Each object, such as clips 401A through 401D, appears as a colored bar in time graph 411. In the example of FIG. 4, all clips 401 are shown on a single row 400; as will be described below, other views are provided wherein clips 401 are shown on separate rows. Layer list 410 shows the hierarchy of rows currently being displayed in time graph 411. This arrangement allows the user to quickly see each clip's 401 place in time, as well as its relative position and duration.

In one embodiment, different types of objects in display 403 are distinguishable based on their appearance. For example, various objects including layers, visual objects (such as video clips 401 or still images), filters, behaviors, audio objects, and keyframes, can be shown in different colors and/or having different text labels or other visual characteristics. In one embodiment, when the user clicks on an object, visual characteristics (such as color, text labeling, and the like) change to indicate that it has been selected.

In one embodiment, additional controls are also provided as part of timeline display 403. For example, the user can zoom in and out in timeline display 403 using either zoom slider 412 or zoom/scroll control bar 413. Each provides functionality for zooming in and out of timeline display 403 horizontally, showing more or less time in the display 403. As the user zooms in, he or she can see greater detail, which lets him or her place objects with greater precision. In one embodiment, as the user moves the zoom slider 412, display 403 remains centered on the current frame.

Zoom/scroll control bar 413 allows the user to scroll through the video project by dragging left or right. The user can also zoom in and out in the display 403 by dragging one of the ends 414 of control bar 413. The width of control bar 413 corresponds to the length of the currently viewed segment of the video project. Dragging one of the ends 414 of control bar 413 towards the center of bar 413 causes display 403 to zoom in; dragging an end 414 away from the center of bar 413 causes display 403 to zoom out. In one embodiment, the center of bar 413 remains fixed as the user zooms in or out, but if the user holds down a modifier key (such as a shift key) while performing the zooming operation, the opposite end 414 remains locked in position so as to allow the user to zoom in or out on the edge of the current view.

Dragging the left end 414 of control bar 413 to the left causes control bar 413 to get longer by zooming out and encompassing the part of display 403 to the left of the current view (earlier in time). This results in a zooming-out function. Dragging the left end 414 of control bar 413 to causes control bar 413 to get shorter by zooming in and excluding the latter part of display 403. Dragging the right end 414 expands or contracts the tail end of display 403 in a similar manner.

In the example of FIG. 4, none of the video clips 401 overlap one another; in other words, they are arranged in a simple "cuts only" (no compositing) fashion. Video clips 401 are shown in a single layer 400. In and out points 408 for each clip 401 are visible within layer 400, and thumbnails 404 depicting the content of clips 401 are shown. The user can interact with clips 401 to lengthen or shorten clips, to move clips around, or to edit or delete clips; such operations are well known in the art of video editing software. For example, the user can drag an in or out point 408 to change the length of a clip 401. The user can expand layer 400 by clicking on button 402.

Figure 5:
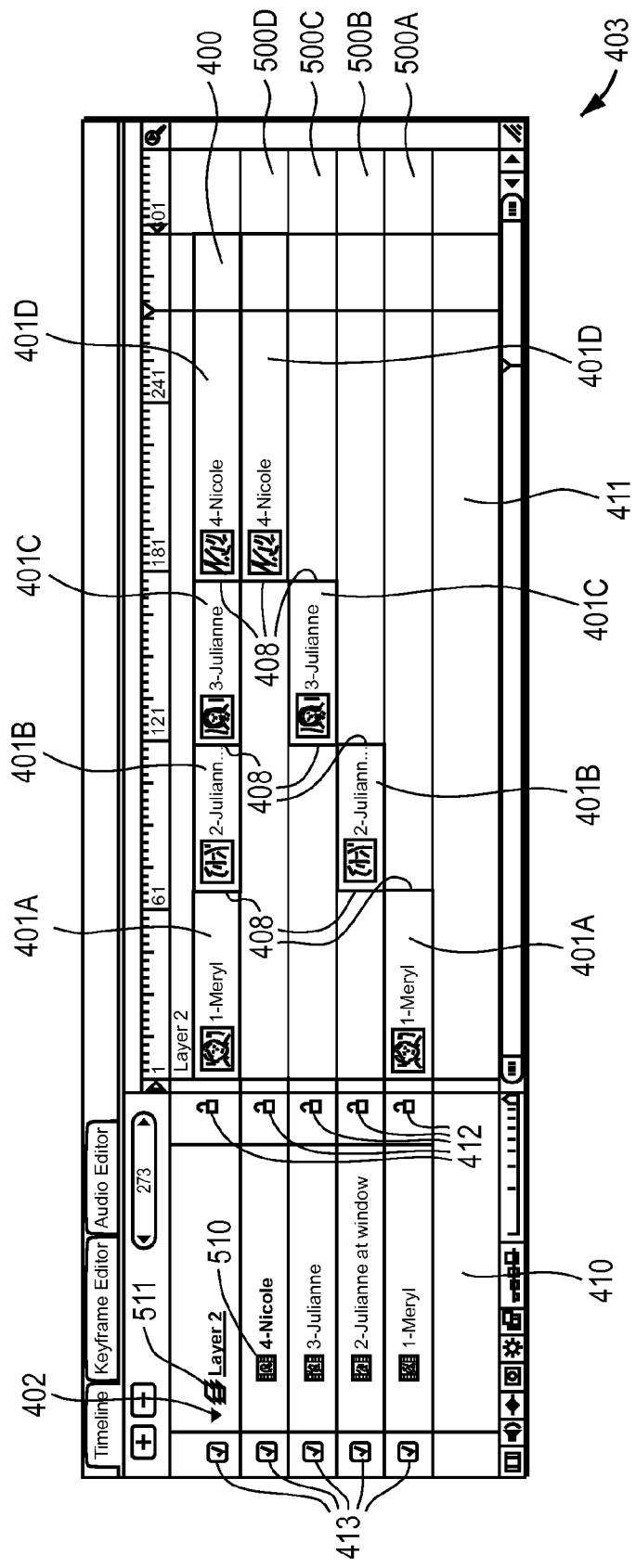
FIG. 5 is a screen shot showing an example of a timeline display having an expanded view including a single overall layer including four video clips, and separate layers for each clip, according to an embodiment of the present invention.

Referring now to FIG. 5, there is shown a screen shot depicting an example of timeline display 403 after the user has clicked on button 402. Here, display 403 includes an expanded view including single overall layer 400 as before, including four video clips 401A through 401D, and also including separate tracks 500A through 500D. Each clip 401 is represented twice: once in overall layer 400 and once in its own individual track 500. For each clip 401, the two representations are vertically aligned with one another. The user can manipulate any clip 401 using either of its two representations. Thus, a user can move an in or out point 408 on layer 400 or on track 500; either way, the length of the corresponding clip 401 is altered. In one embodiment, moving a point 408 on an individual track 500 causes only the clip 401 for that layer to be changed (for example, if the user causes the clip 401 to overlap another clip 401, the two clips are composited with one another for the duration of the overlapping portion), whereas moving a point 408 on layer 400 causes the cut point to move, so that the clips 401 immediately preceding and following the moved point 408 are both adjusted (for example, if the user moves a point 408 to the right, the preceding clip 401 is lengthened and the following clip 401 is shortened). In other embodiments, there is no distinction between editing operations performed on layers 400 and tracks 500, respectively.

In the example of FIG. 5, layer list 410 is also expanded so that it mirrors the layers 400 and tracks 500 displayed in time graph 411. Layer list 410 shows project tracks and objects, and their stacking order. For each track 500, a track icon 510 is shown. Also, a layer icon 511 is shown for layer 400. In addition, behaviors, filters and masks (not shown) that are applied to a layer or object can also be displayed in layer list 410. The user can move items (such as icons 510, 511) in layer list 410 to reorder layers, tracks, and objects. Any changes made in time graph 411 are immediately reflected in layer list 410, and vice versa. In addition, the user can click on lock buttons 412 to temporarily lock clips 401 to prevent further editing. The user can click on checkboxes 413 to selectively omit or include tracks 500, clips 401, and other objects from the video project. In one embodiment, when a clip 401 is disabled, it is dimmed in timeline display 403.

The user can collapse the display by clicking on button 402, which results in a return to display 403 of FIG. 4. In one embodiment, the user can selectively collapse and expand different parts of layer list 410 by clicking on other buttons within list 410. Individual objects with masks, generators, or filters can be collapsed to hide those effects' bars. When an object or effect is collapsed in this manner, it still is included in the video project; unlike enabling or disabling clips 401, collapsing and expanding the display 403 has no effect on the video project but is designed to help manage the view of timeline display 403.

Figure 6:
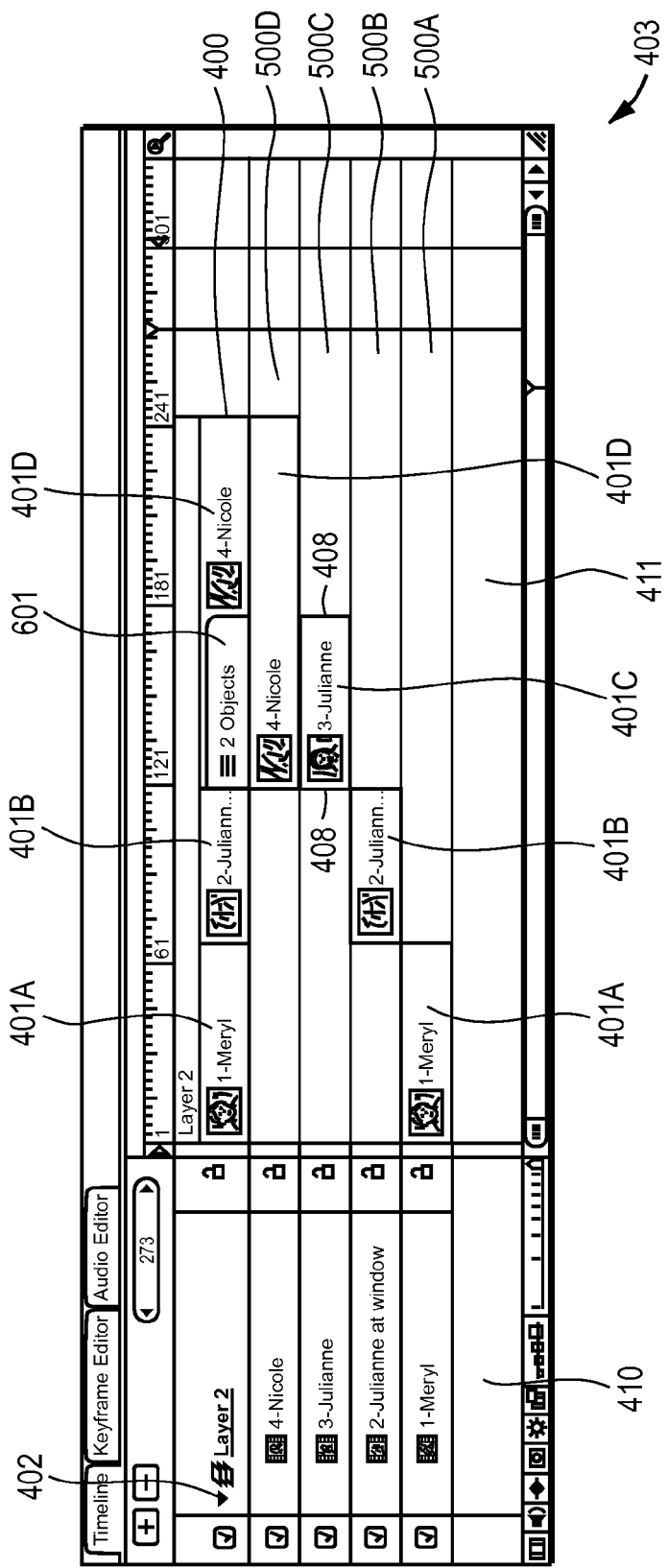
FIG. 6 is a screen shot showing an example of a timeline display having an expanded view wherein one clip is superimposed on a second clip, according to an embodiment of the present invention.

Referring now to FIG. 6, there is shown a screen shot depicting an example of timeline display 403 wherein one clip 401C is superimposed on a second clip 401D, according to an embodiment of the present invention. In one embodiment, this superimposition of clips 401 results in a compositing operation that may be selectable by the user. In layer 400, the area of overlap is depicted by shaded region 601 to indicate that a composite of two clips 401 will be displayed. In one embodiment, region 601 indicates, via a text label, that two objects are present in the overlap. The portion of clip 401D that does not overlap clip 401C is shown in layer 400, adjacent to region 601. Clips 401, including clip 401C, are shown in their respective tracks 500 as before. The user can manipulate the length of the overlapping section by dragging either edge of region 601, or by dragging in or out points 408 in track 500C.

The example of FIG. 6 illustrates how the user interface of the present invention clearly shows areas where clips 401 overlap and are to be composited, both in an overall layer 400 and in individual tracks 500C. Here, the utility of the two-level display scheme is evident: the user can see (and manipulate) the overall structure of the series of clips 401 in layer 400, and can simultaneously (if desired), see (and manipulate) the details of the clips 401 in their respective tracks 500C.

The user can collapse the display by clicking on button 402, which results in tracks 500 being hidden, so that only layer 400 remains. Layer 400 still shows clips 401A, 401B, and 401C, along with overlap region 601. The user can still manipulate any of these objects in the same manner as described above.

Figure 7:
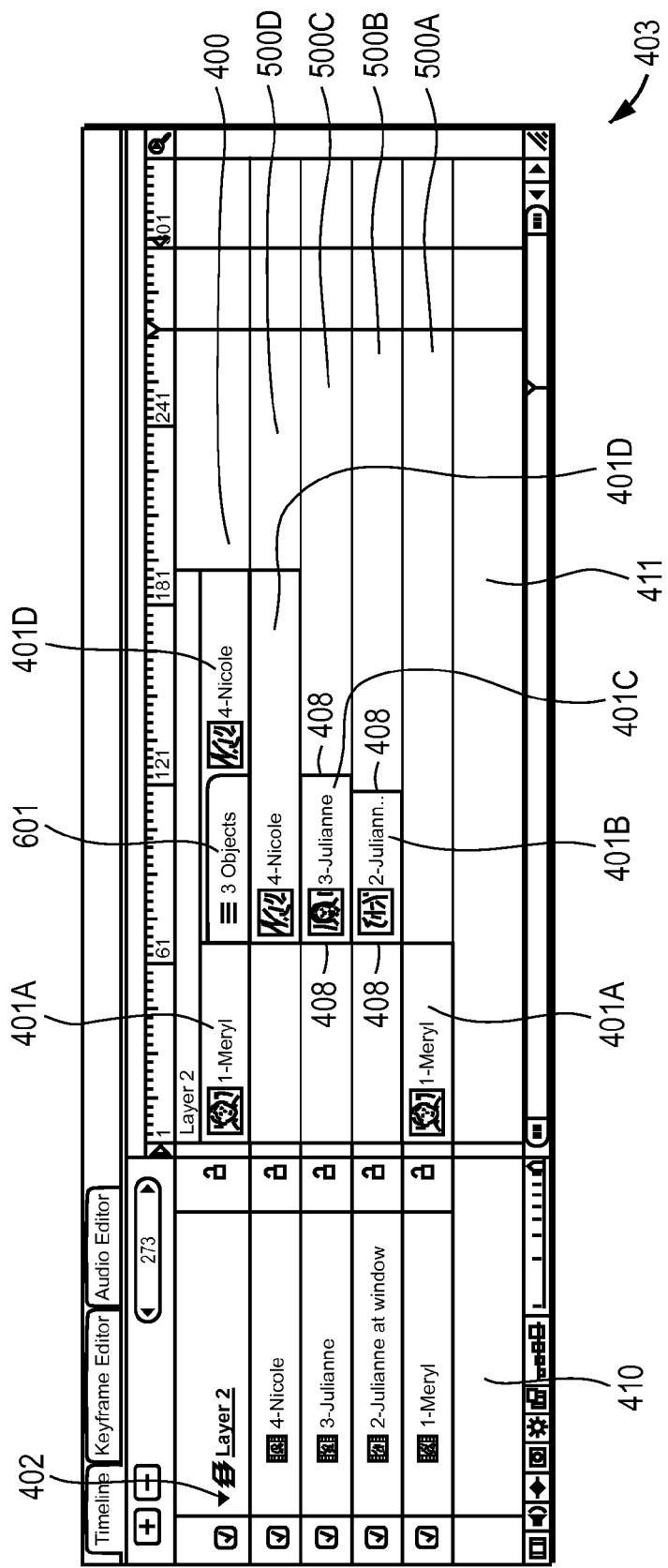
FIG. 7 is a screen shot showing an example of a timeline display having an expanded view wherein three clips are superimposed on one another, according to an embodiment of the present invention.

Referring now to FIG. 7, there is shown a screen shot depicting an example of timeline display 403 wherein clips 401B, 401C, and 401D are superimposed on one another, according to an embodiment of the present invention. In layer 400, the area of overlap is depicted by shaded region 601 to indicate that a composite of three clips 401 will be displayed. In one embodiment, region 601 indicates, via a text label, that three objects are present in the overlap. The portion of clip 401D that does not overlap clips 401B and 401C is shown in layer 400, adjacent to region 601. Clips 401, including clips 401B and 401C, are shown in their respective tracks 500 as before. The user can manipulate the length of the overlapping section by dragging either edge of region 601, or by dragging in or out points 408 in tracks 500. The user can collapse the display by clicking on button 402, which results in tracks 500 being hidden, so that only layer 400 remains, as before.

Figure 8:
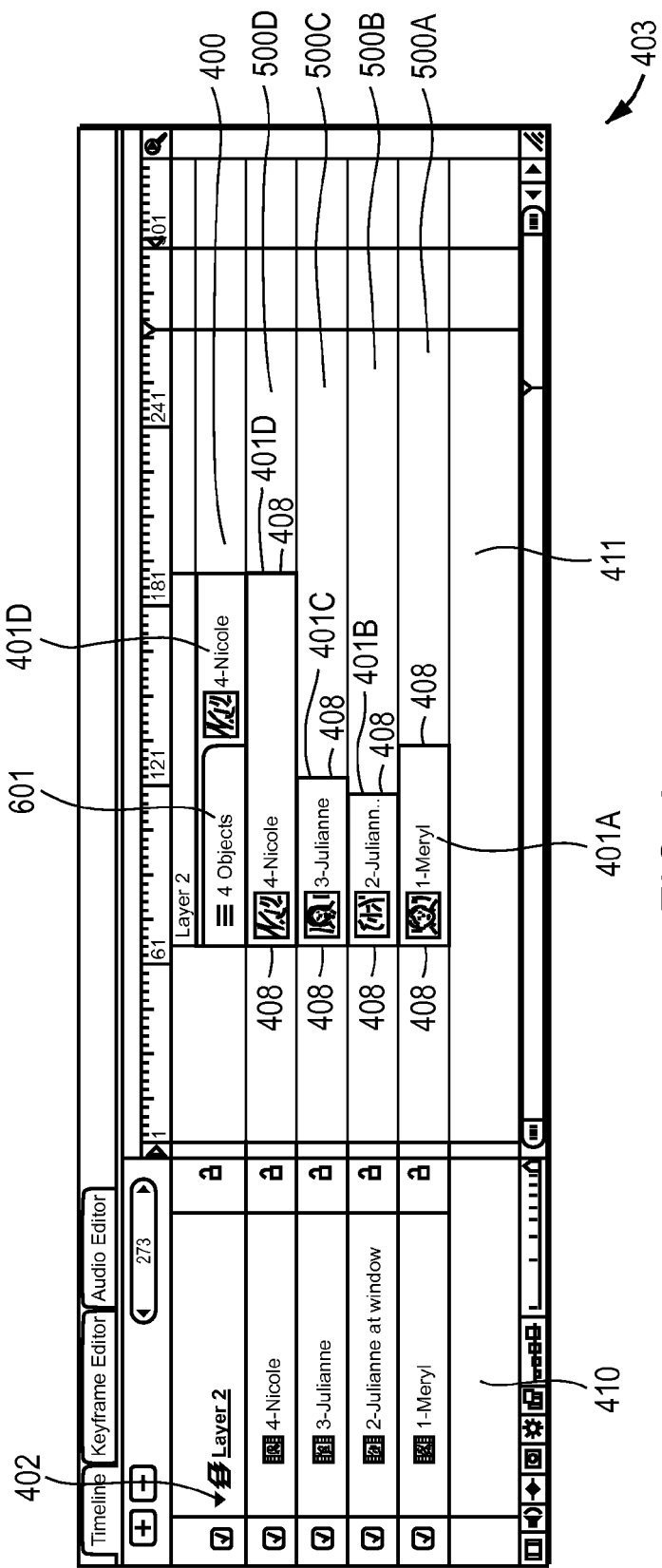
FIG. 8 is a screen shot showing an example of a timeline display having an expanded view wherein four clips are superimposed on one another, according to an embodiment of the present invention.

Referring now to FIG. 8, there is shown a screen shot depicting an example of timeline display 403 wherein clips 401A, 401B, 401C, and 401D are superimposed on one another, according to an embodiment of the present invention. In layer 400, the area of overlap is depicted by shaded region 601 to indicate that a composite of four clips 401 will be displayed. In one embodiment, region 601 indicates, via a text label, that 4 objects are present in the overlap. The portion of clip 401D that does not overlap clips 401A, 401B, and 401C is shown in layer 400, adjacent to region 601. Clips 401 are shown in their respective tracks 500 as before. The user can manipulate the length of the overlapping section by dragging either edge of region 601, or by dragging in or out points 408 in tracks 500. The user can collapse the display by clicking on button 402, which results in tracks 500 being hidden, so that only layer 400 remains, as before.

Drag-and-Drop Editing

The user can add images and clips to the video project by dragging and dropping objects into layer list 410 or time graph 411. In one embodiment, dragging files into time graph 411 provides additional editing options such as compositing, inserting, overwriting or replacing existing clips 401.

Figure 9:
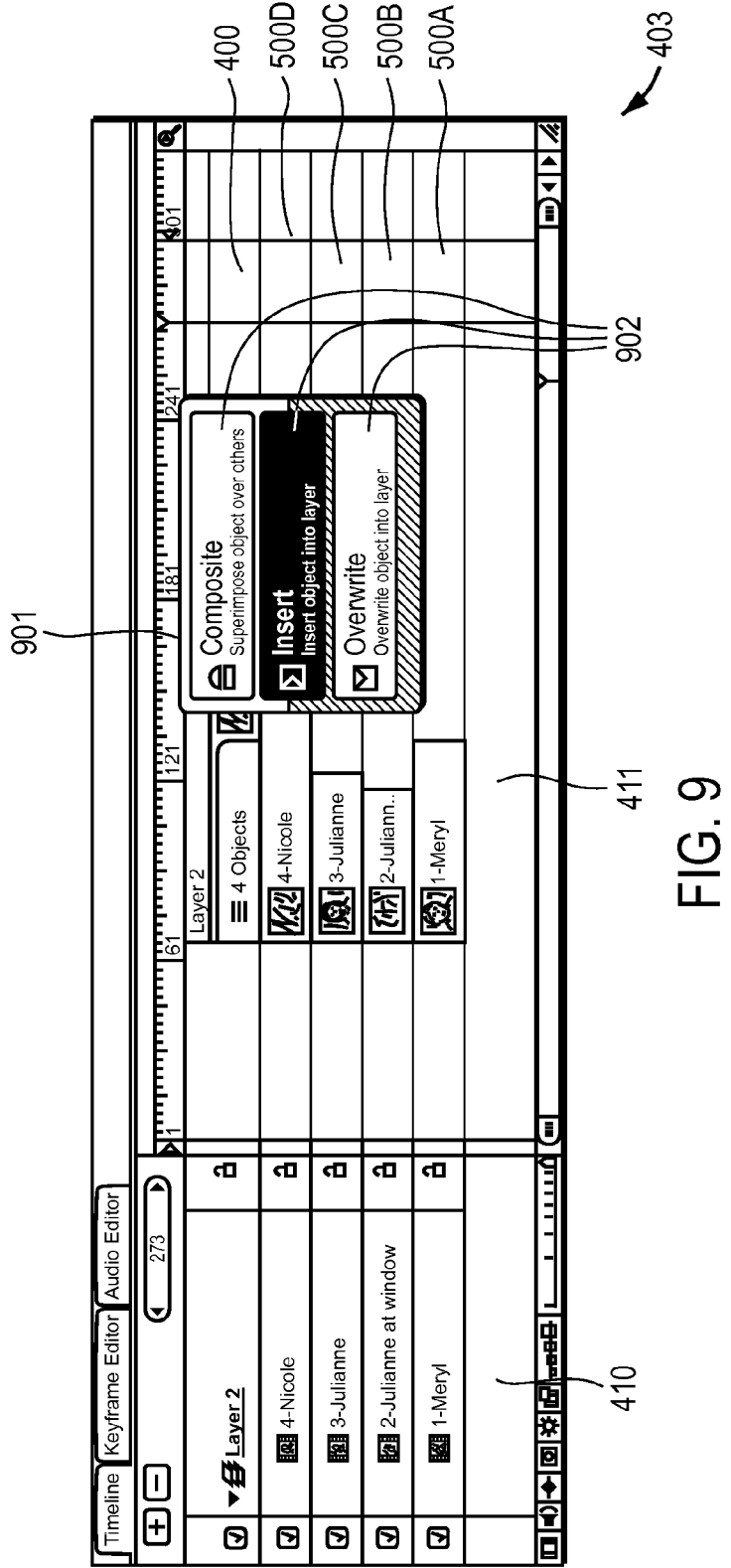
FIG. 9 is a screen shot showing an example of drag-and-drop editing in the context of a video editing application, according to an embodiment of the present invention.

Referring now to FIG. 9, there is shown a screen shot depicting an example of drag-and-drop editing according to an embodiment of the present invention. Here, a new clip is being dragged by the user onto a location in layer 400. In one embodiment, the user can drag the new clip to either layer 400 or one of tracks 500. In one embodiment, the user can drag the new clip to layer 400 when the timeline display 403 is in a collapsed state (as shown in FIG. 4).

In one embodiment, holding the mouse for a moment causes menu 901 to be displayed; in other embodiments, other user actions (such as clicking a mouse button, releasing the mouse button, activating a keyboard command, or performing some other operation) activate menu 901. Menu 901 provides a number of commands 902 representing different ways that the new clip can be added to the video project.

Figure 11A:
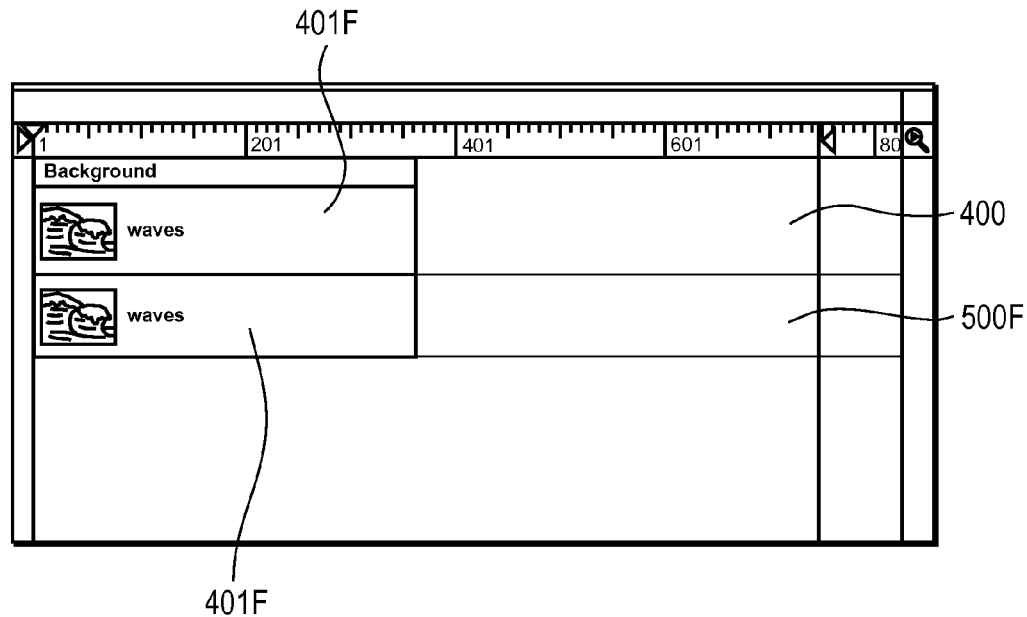
FIGS. 11A and 11B show an example of a composite command.
Figure 11B:
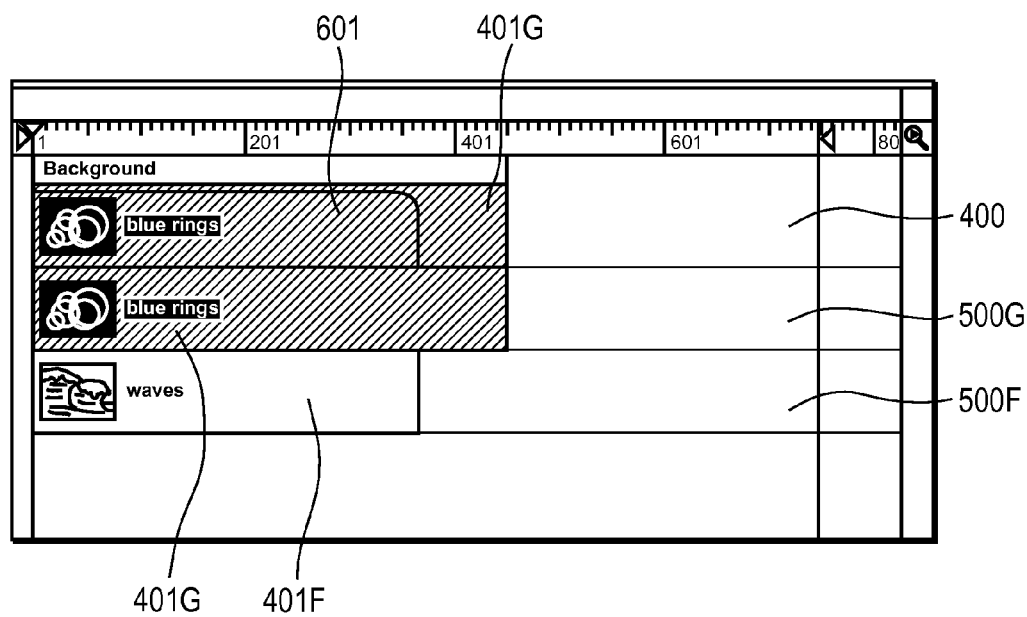

Referring now to FIGS. 11A and 11B, there is shown an example of a portion of display 403 before and after a composite command. The composite command causes new clip 401G to be composited with existing clip 401F at the location specified. New clip 401G is added to a new track 500G within the active layer 400 and all objects remain on screen simultaneously. In layer 400, overlap region 601 is depicted, along with non-overlapping portion of clip 401G. In FIG. 11B, clip 401G has been selected; thus the name of clip 401G ("blue rings") is shown in overlap region 601 instead of an indication of the number of overlapping clips 401.

Figure 12A:
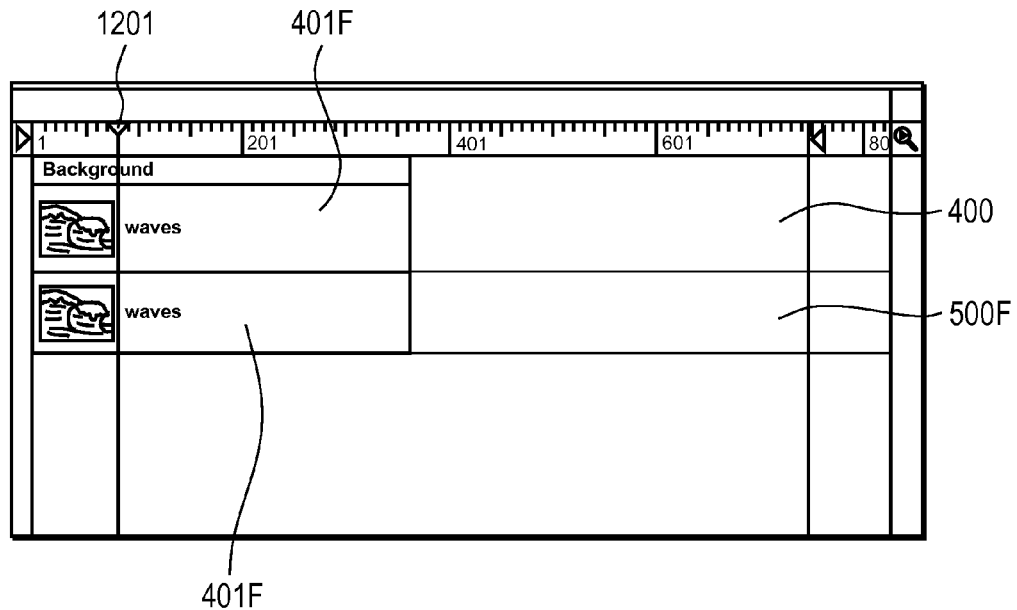
FIGS. 12A and 12B show an example of an insert command.
Figure 12B:
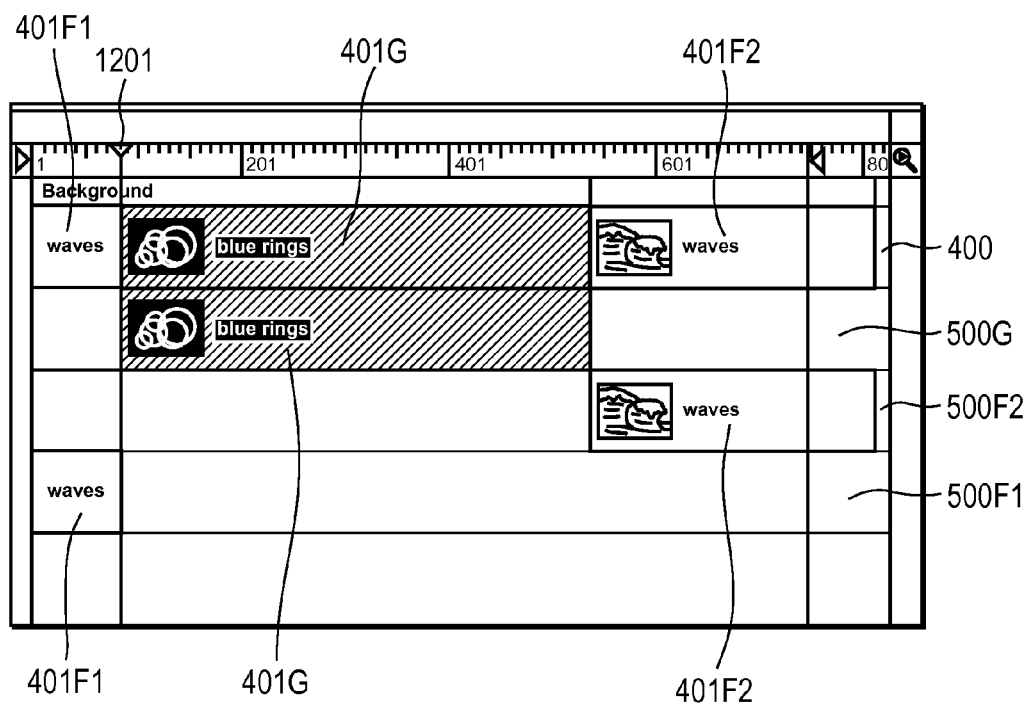

Referring now to FIGS. 12A and 12B, there is shown an example of a portion of display 403 before and after an insert command. Insert command causes the new clip 401G to be inserted at the location specified (indicated by current location marker 1201), so that existing clip 401F is moved to the right (so that they follow new clip 401G on the time axis) and/or split as needed. In the example shown, clip 401F is split into two parts 401F1 and 401F2. Track 500F is replaced by two tracks 500F1 and 500F2, one for each part of the split clip.

Figure 13A:
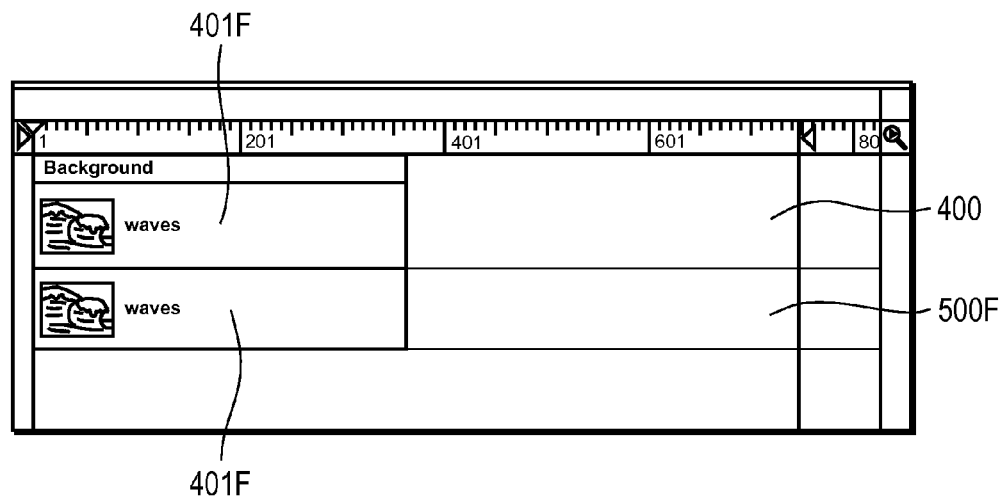
FIGS. 13A and 13B show an example of an overwrite command.
Figure 13B:
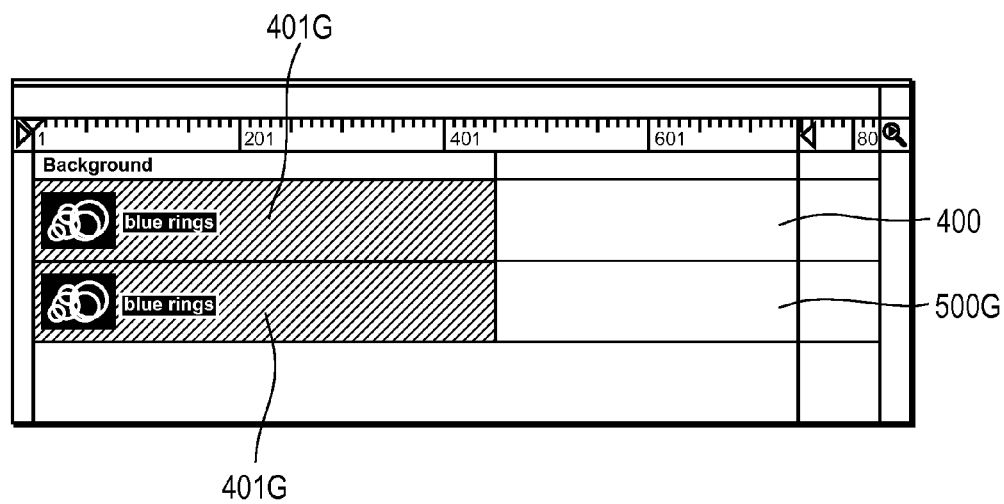

Referring now to FIGS. 13A and 13B, there is shown an example of a portion of display 403 before and after an overwrite command. Overwrite command deletes existing clip 401F at the dropped location, replacing it with new clip 401G. Track 500F is replaced by track 500G.

Figure 14A:
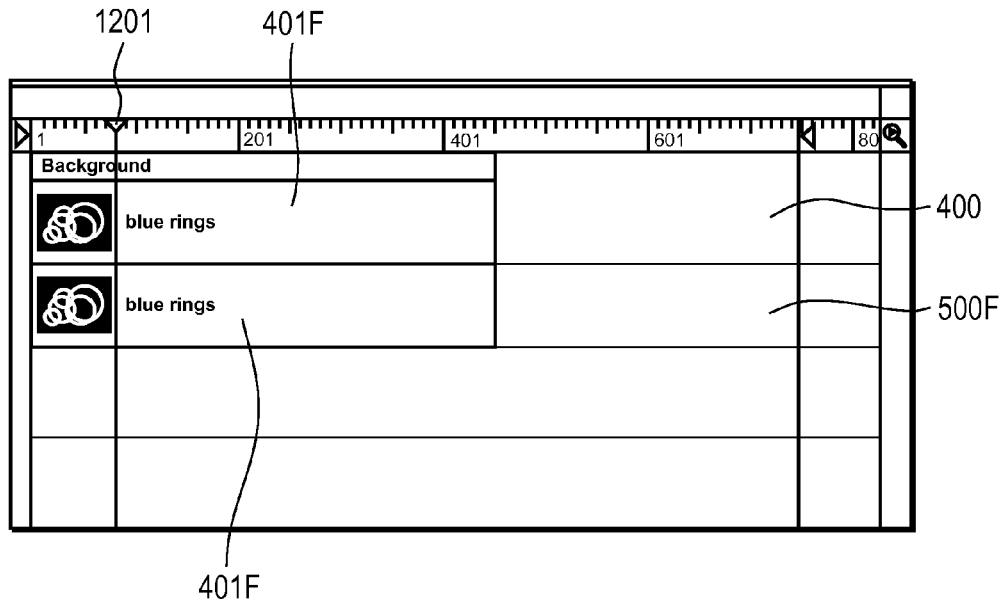
FIGS. 14A and 14B show an example of an overwrite command, wherein the new clip is shorted than the existing clip.
Figure 14B:
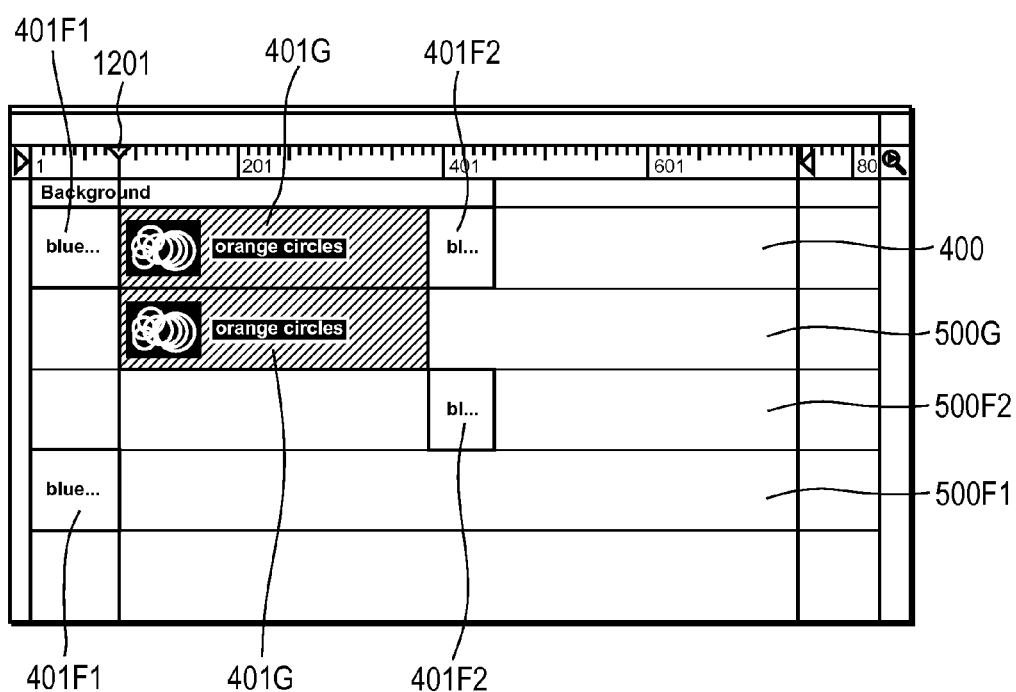

Referring now to FIGS. 14A and 14B, there is shown an example of a portion of display 403 before and after an overwrite command, wherein the new clip 401G is shorter than the existing clip 401F. Existing clip 401F is split at the location specified (indicated by current location marker 1201). A portion of clip 401F corresponding to the length of new clip 401G is deleted and replaced with new clip 401G. Remaining portions 401F1 and 401F2 are not deleted. Track 500F is replaced by two tracks 500F1 and 500F2, one for each part of the split clip. Track 500G is added and populated with new clip 401G.

Figure 15A:
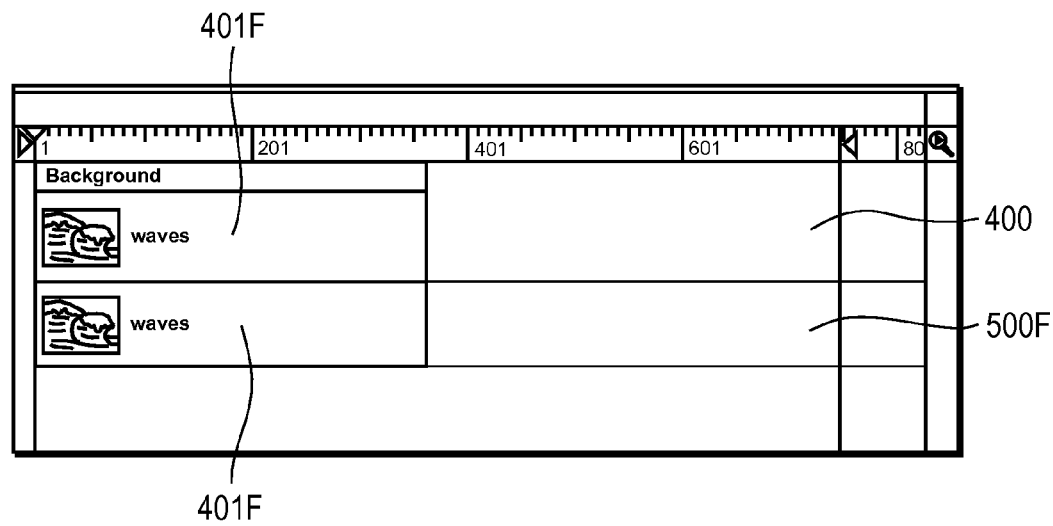
FIGS. 15A and 15B show an example of an exchange command.
Figure 15B:
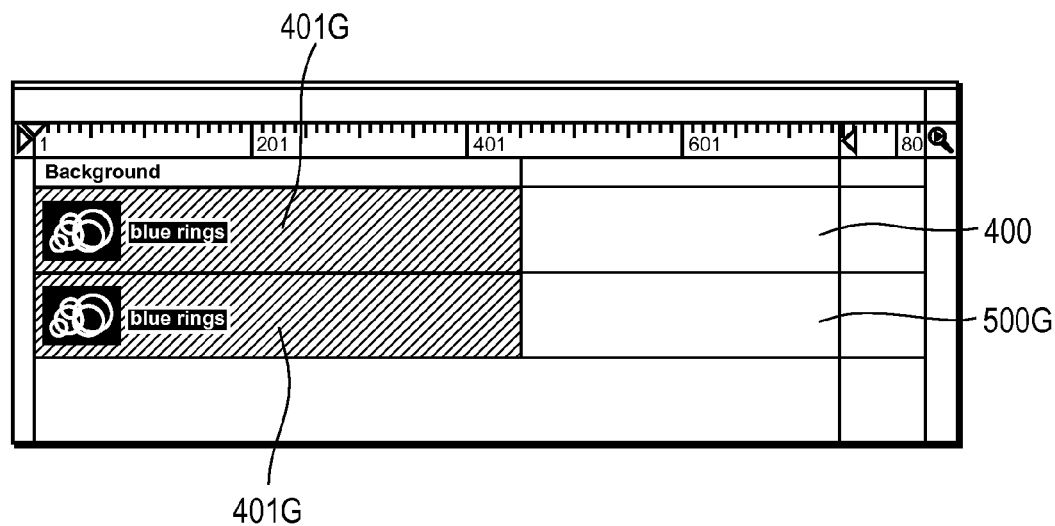

Referring now to FIGS. 15A and 15B, there is shown an example of a portion of display 403 before and after an exchange command. Old clip 401F is replaced with a portion of new clip 401G having a length equal to that of old clip 401F. For example, if old clip 401F is five seconds long and new clip 401G is thirty seconds long, old clip 401F is replaced by the first five seconds of new clip 401G. Conversely, if old clip 401F is thirty seconds long and new clip 401G is five seconds long, only the first five seconds of old clip 401F is replaced by new clip 401G, and the rest of old clip 401F remains. Track 500F is replaced by track 500G. In one embodiment, the exchange command transfers any filters, behaviors and keyframes from the original object onto the new object.

In one embodiment, menu 901 includes different commands 902 depending on where in display 403 the user drops the clip. For example, if the clip is dragged to a track 500, the user is presented with Composite, Insert or Overwrite commands 902. If the user drags to one of the objects within a track 500, a Replace command 902 is also presented. If the user drags to layer list 410, only the Composite command 902 is shown. In one embodiment, if the user drops the object before menu 901 appears, a default choice (such as composite) is applied.

Figure 10:
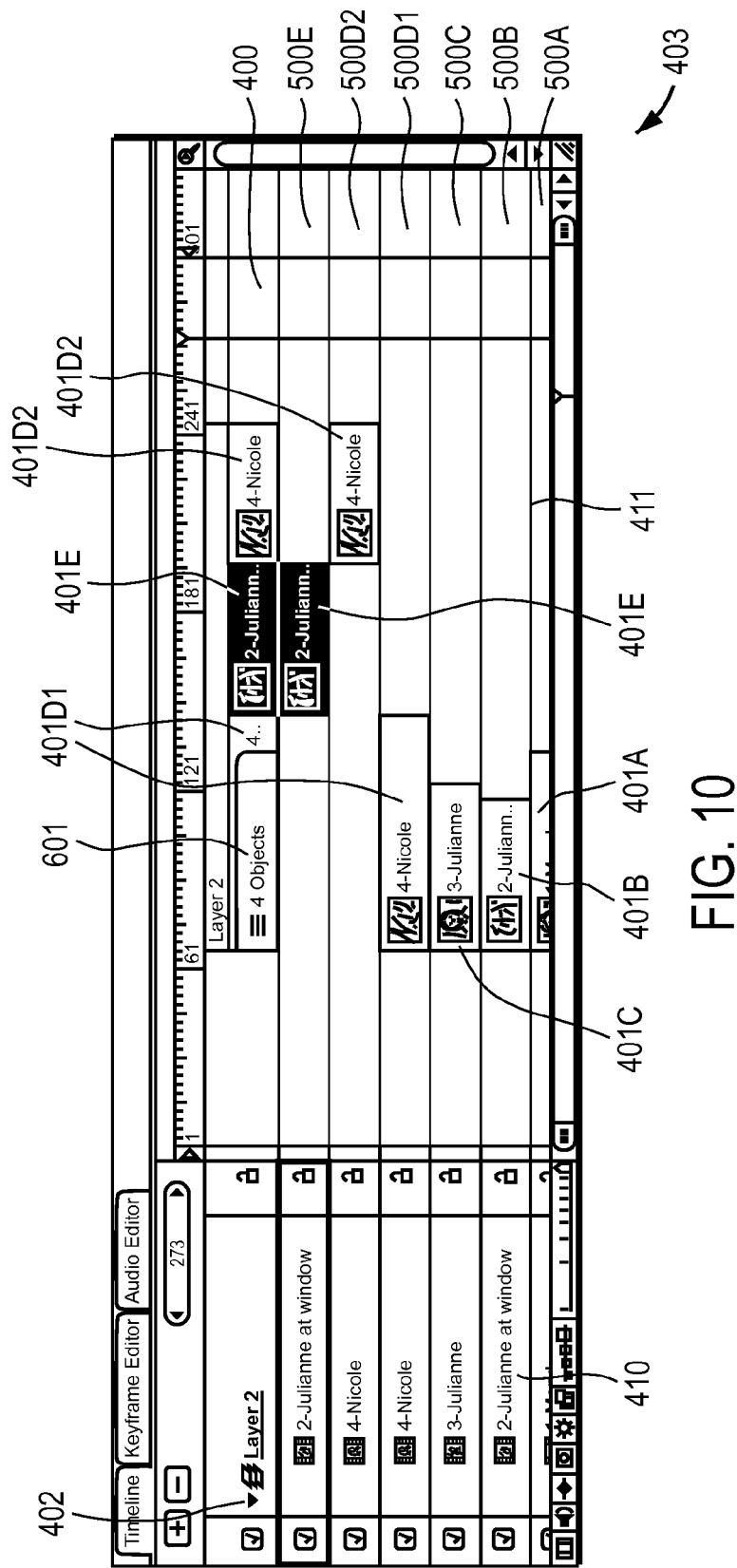
FIG. 10 is a screen shot showing an example of an expanded view after a drag-and-drop editing operation, according to an embodiment of the present invention.

Referring now to FIG. 10 there is shown a screen shot depicting an example of an expanded view after the drag-and-drop editing operation of FIG. 9, according to an embodiment of the present invention. The user has selected an Insert operation. New clip 401E is inserted at the location specified by the drag-and-drop operation. Clip 401D is split into two parts, 401D1 and 401D2, to make room for clip 401E. A new track 500E is established for new clip 401E; clip 401E is shown both in track 500E and in layer 400. Track 500D is replaced by two new tracks 500D1 and 500D2, one for each of the clip parts 401D1 and 401D2. On layer 400, overlap region 601 is depicted, along with non-overlapping portion of clip 401D1 and clips 401E and 401D2.

In one embodiment, when the user drags more than one item onto display 403, the objects appear on their own tracks 500 above any existing objects. This is equivalent to performing a composite edit with a single object. A drop menu 901 appears to allow the user to choose whether the additional objects should be composited with one another, or whether they should appear one after another (sequentially).

In one embodiment, if the user drags an item over a collapsed layer 400, the layer temporarily expands so that the user can drop the item onto a specific location within a track 500 of layer 400. Once the drop operation is complete, the layer collapses again.

In one embodiment, the user can set preferences that specify where an item is placed when dropped in layer list 410. The user can choose between placing items at the beginning of the project or at a current position. The user can also set, via a preferences screen, the delay time before menu 901 appears.

Nesting

In one embodiment, the user can place one layer 400 inside another layer 400. This provides the flexibility to create a layer 400 containing multiple objects, and then treat that entire layer 400 as a single object within another layer 400. This technique is referred to as nesting or grouping. Nesting allows the user to simplify the screen display and better organize the video project, grouping objects and layers into fewer containers. It also allows the user to manipulate a group of objects as one.

In one embodiment, the user nests one layer 400 inside another as follows:

Click the layer icon 511 in layer list 410.

Drag icon 511 onto another layer 400. A black border highlights the destination layer 400.

Drop the layer icon 511. The first layer is now nested inside the destination layer 400.

Other mechanisms for nesting may also be provided, including menu commands and/or keyboard commands.

The user can return a nested layer 400 to its original state by selecting the layer and activating an ungroup command. The layer 400 is restored into individual objects.

The user can remove a layer 400 from within a nest by clicking the layer icon 511 in layer list 410, dragging the layer icon 511 out of the existing parent layer to the area above the highest track, and dropping the layer icon 511. The dropped layer 400 is restored to primary layer status.

The user can delete a layer 400 by selecting it and activating a delete command.

Any of these operations can also be performed on multiple tracks or layers by selecting desired tracks or layers and then dragging or performing the commands described above.

Editing in the Layer Track

As described above, the user can perform a variety of editing tasks directly in layer 400, even if layer 400 is collapsed. Ordinarily, layer 400 indicates the name of a clip 401 where there is only one clip, and/or an overlap region 601 showing the number of composited clips 401 for areas where more than one clip 401 overlap.

The user can move clips 401 within layer 400. If the user clicks an area where only one clip 401 exists, that clip 401 is moved as the user drags the mouse. If the user clicks an overlap region 601, all of the overlapping items are moved as the user drags the mouse.

Trimming the edges of layer 400 automatically trims the edges of clips 401 within the layer 400. If there is only one clip 401, trimming layer 400 trims that clip 401. If there is more than one clip 401 lined up with the edge of the layer 400, trimming the layer 400 trims all of the clips 401 lined up with the edge being trimmed.

The user can slip a clip 401 (in other words, use an earlier or later portion of the media without moving the position or duration of the clip 401) by, for example, clicking while holding down a modifier key (such as an option key) in an area of layer 400 where clip 401 is located, and dragging left or right to use an earlier or later portion of the media.

Selection Linking

Figure 16:
FIG. 16 is a screen shot showing an example of a canvas and a miniature timeline, according to one embodiment of the present invention.
Figure 19:
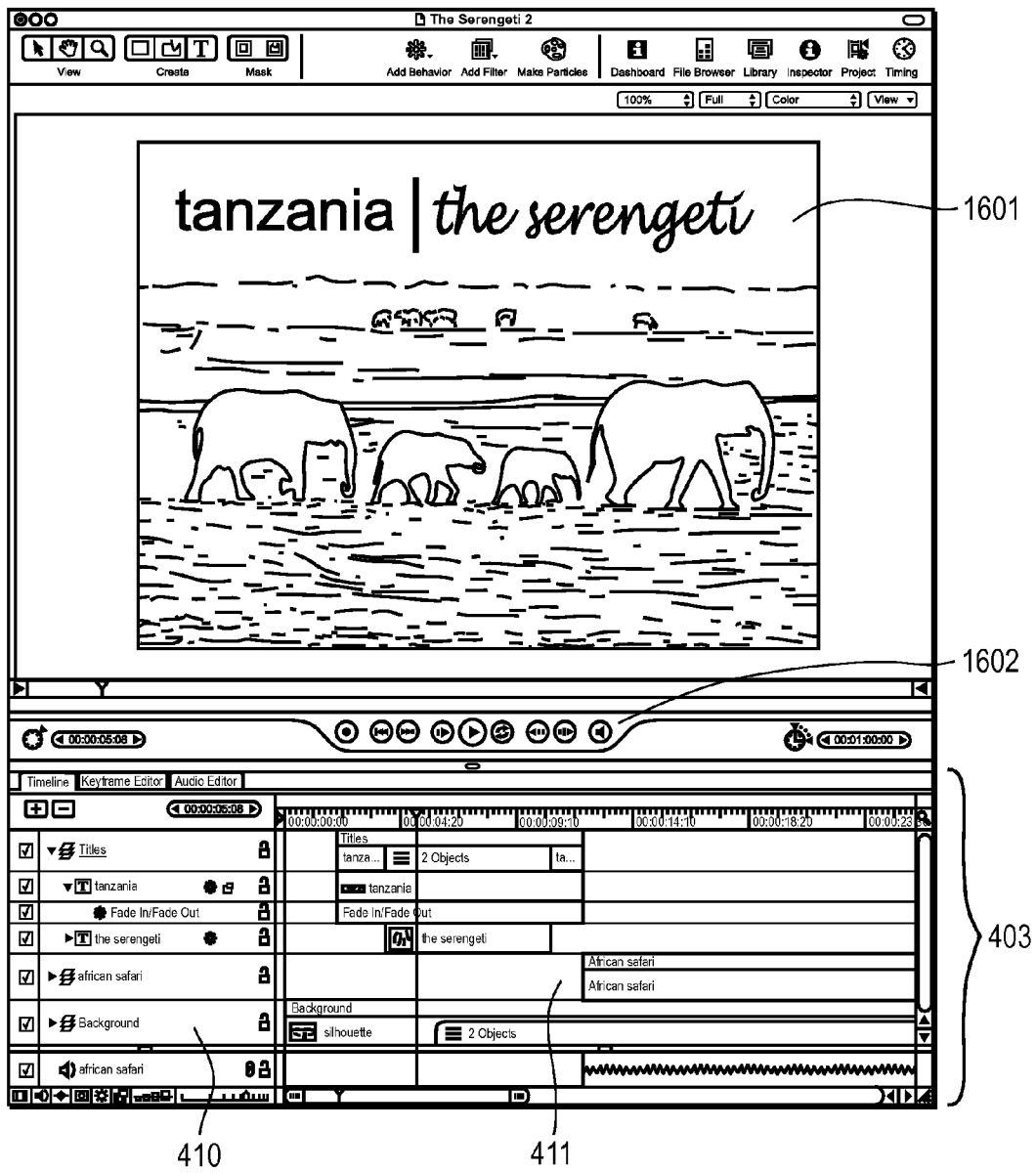
FIG. 19 is a screen shot showing an example of a canvas and a timeline, according to one embodiment of the present invention.

In one embodiment, as shown in the example of FIG. 19, a canvas 1601 is displayed alongside timeline display 403. Canvas 1601 is an area of the screen where video clips can be arranged on top of one another or moved around a video project screen. Buttons 1602 are provided for controlling video playback in canvas 1601, including for example playing, starting, stopping, fast-forwarding, and the like. In one embodiment, when the user selects a video clip within canvas 1601, the corresponding clip representation is selected in timeline display 403, and vice versa. The example of FIG. 19 also depicts other types of elements in timeline 403, including fade in/fade out effects, titles, and backgrounds, all of which can be controlled using the techniques described herein. Canvas 1601 can also be displayed without timeline display 403, as shown in FIG. 16.

Miniature Timeline

Figure 17:
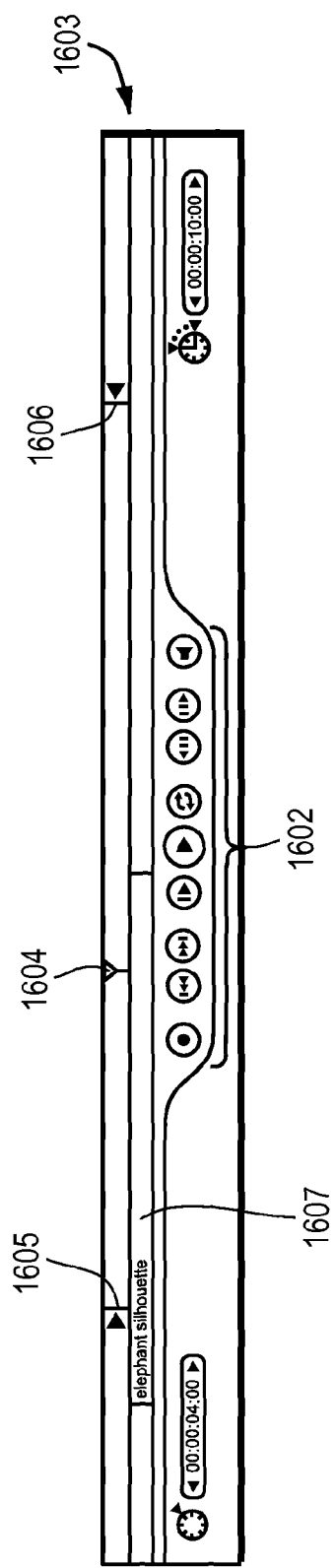
FIG. 17 is a screen shot showing an example of a miniature timeline, according to one embodiment of the present invention.
Figure 18:
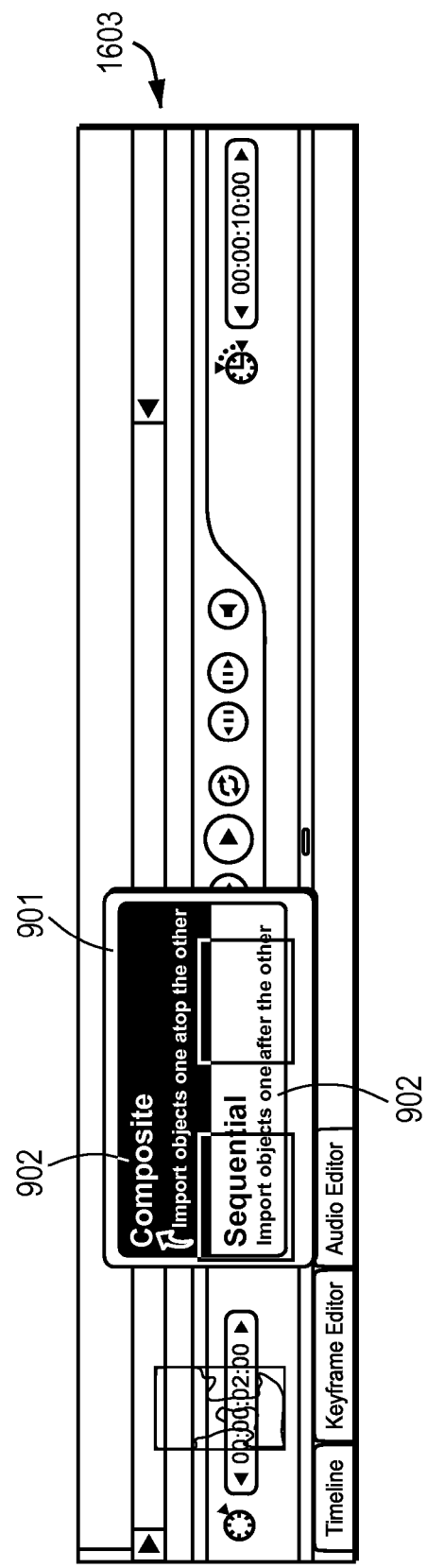
FIG. 18 is a screen shot showing an example of a drop menu for a miniature timeline, according to one embodiment of the present invention.

In one embodiment, the present invention provides a miniature version of a timeline associated with a displayed video clip. Referring now to FIG. 16, there is shown an example of a miniature timeline 1603 displayed along with canvas 1601. Referring also to FIG. 17, there is shown an enlarged representation of timeline 1603.

In one embodiment, miniature timeline 1603 is automatically displayed when the user selects, in canvas 1601, an object having a temporal component (such as a video clip, behavior, or object).

Miniature timeline 1603 includes playhead 1604 that indicates what frame is being viewed in canvas 1601, and in and out markers 1605, 1606 to identify the play range. The width of miniature timeline 1603 represents the entire duration of the project.

The user can drag playhead 1604 to the left or right to scrub the project, or to jump quickly to a particular point in time. The user can also change the project in and out points by dragging markers 1605, 1606 to the desired positions. In addition, the user is able to perform some subset of operations that would normally be available for objects in a timeline. The user can drag objects into miniature timeline 1603, can move, trim, and slip objects, and can perform other operations. In one embodiment, when the user drags a clip into miniature timeline 1603, a drop menu 901 appears, including a number of commands 902 representing different ways that the new clip can be added to the video project, as described above in connection with FIG. 9.

In one embodiment, miniature timeline 1603 is automatically dismissed when the corresponding on-screen object is deselected or deleted, or when it no longer appears on the screen. In one embodiment, two or more miniature timelines 1603 may be simultaneously displayed when two or more objects having temporal components are selected.

One skilled in the art will recognize that these Figures are merely examples of the operation of the invention according to one embodiment, and that other user interface arrangements and modes of operation can be used without departing from the essential characteristics of the invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A system for editing a project comprising a plurality of media clips, comprising an output device for displaying:
   a canvas, comprising a representation of the project, wherein if the project is being played the representation of the project shows the project as the project is playing, and wherein if the project is not being played the representation of the project comprises a plurality of selectable and spatially movable representations of the plurality of media clips that comprise the project, and wherein a location of a spatially movable representation represents where the media clip is displayed within the project when the project is playing; and
   a timeline display representing a duration of the project, the timeline display comprising, for each currently selected representation of a media clip in the canvas, a corresponding timeline representation of the media clip;
wherein the timeline representation is displayed when the corresponding spatially movable representation is selected, and wherein the timeline representation is absent when the corresponding spatially movable representation is not selected.

2. The system of claim 1, wherein each timeline representation of a media clip is editable.

3. The system of claim 1, wherein the spatially movable representations are updated responsive to edits made to the corresponding timeline representations.

4. The system of claim 1, wherein the timeline representations are updated responsive to edits made to the corresponding spatially movable representations.

5. A computer-implemented method for editing a project comprising a plurality of media clips, comprising:
displaying a canvas, comprising a representation of the project, wherein if the project is being played the representation of the project shows the project as the project is playing, and wherein if the project is not being played the representation of the project comprises a plurality of selectable and spatially movable representations of the plurality of media clips that comprise the project, and wherein a location of a spatially movable representation represents where the media clip is displayed within the project when the project is playing; and
displaying a timeline representing a duration of the project, the timeline comprising, for each currently selected representation of a media clip in the canvas, a corresponding timeline representation of the media clip;
wherein the timeline representation is displayed when the corresponding spatially movable representation is selected, and wherein the timeline representation is absent when the corresponding spatially movable representation is not selected.

6. The method of claim 5, wherein displaying each timeline representation comprises displaying an editable timeline representation.

7. The method of claim 5, further comprising updating the spatially movable representations responsive to edits made to the corresponding timeline representations.

8. The method of claim 5, further comprising updating the timeline representations responsive to edits made to the corresponding spatially movable representations.

9. A computer program product for editing a project comprising a plurality of media clips, comprising:
a computer storage medium; and
computer program code, encoded on the medium, for:
displaying a canvas, comprising a representation of the project, wherein if the project is being played the representation of the project shows the project as the project is playing, and wherein if the project is not being played the representation of the project comprises a plurality of selectable and spatially movable representations of the plurality of media clips that comprise the project, and wherein a location of a spatially movable representation represents where the media clip is displayed within the project when the project is playing; and
displaying a timeline representing a duration of the project, the timeline comprising, for each currently selected representation of a media clip in the canvas, a corresponding timeline representation of the media clip;
wherein the timeline representation is displayed when the corresponding spatially movable representation is selected, and wherein the timeline representation is absent when the corresponding spatially movable representation is not selected.

10. The computer program product of claim 9, wherein the computer program code for displaying each timeline representation comprises computer program code for displaying an editable timeline representation.

11. The computer program product of claim 9, further comprising computer program code for updating the spatially movable representations responsive to edits made to the corresponding timeline representations.

12. The computer program product of claim 9, further comprising computer program code for updating the timeline representations responsive to edits made to the corresponding spatially movable representations.

13. The system of claim 1, wherein the timeline display further comprises a playhead that indicates which frame is being viewed in the canvas.

14. The system of claim 13, wherein dragging the playhead scrubs the project in the canvas or jumps to a particular point in time in the project in the canvas.

15. The system of claim 1, wherein the timeline display further comprises an in marker and an out marker that indicate a play range.

16. The system of claim 15, wherein dragging the in marker changes an in point of the project, and wherein dragging the out marker changes an out point of the project.

17. The system of claim 1, wherein a width of the timeline display represents an entire duration of the project.

18. The system of claim 2, wherein a timeline representation of a media clip is editable by trimming the media clip.

19. The system of claim 2, wherein a timeline representation of a media clip is editable by moving the media clip within the timeline display.

20. The system of claim 2, wherein a timeline representation of a media clip is editable by slipping the media clip within the timeline display.

21. The system of claim 1, wherein the timeline display further comprises, responsive to a new media clip being dragged into the timeline display, a new timeline representation of the new media clip.

22. The system of claim 21, wherein the new timeline representation of the new media clip is composited at the location in the timeline display where the new media clip was dragged responsive to a selection of a composite command in a drop menu.

23. The system of claim 21, wherein the new timeline representation of the new media clip is inserted at the location in the timeline display where the new media clip was dragged responsive to a selection of an insert command in a drop menu.

24. The system of claim 21, wherein the new timeline representation of the new media clip overwrites timeline representations of media clips at the location in the timeline display where the new media clip was dragged responsive to a selection of an overwrite command in a drop menu.

25. The method of claim 5, wherein the timeline further comprises a playhead that indicates which frame is being viewed in the canvas.

26. The method of claim 25, wherein dragging the playhead scrubs the project in the canvas or jumps to a particular point in time in the project in the canvas.

27. The method of claim 5, wherein the timeline further comprises an in marker and an out marker that indicate a play range.

28. The method of claim 27, wherein dragging the in marker changes an in point of the project, and wherein dragging the out marker changes an out point of the project.

29. The method of claim 5, wherein a width of the timeline represents an entire duration of the project.

30. The method of claim 6, wherein an editable timeline representation of a media clip is editable by trimming the media clip.

31. The method of claim 6, wherein an editable timeline representation of a media clip is editable by moving the media clip within the timeline.

32. The method of claim 6, wherein an editable timeline representation of a media clip is editable by slipping the media clip within the timeline.

33. The method of claim 5, wherein displaying the timeline further comprises, responsive to a new media clip being dragged into the timeline, displaying a new timeline representation of the new media clip.

34. The method of claim 33, wherein the new timeline representation of the new media clip is composited at the location in the timeline display where the new media clip was dragged responsive to a selection of a composite command in a drop menu.

35. The method of claim 33, wherein the new timeline representation of the new media clip is inserted at the location in the timeline display where the new media clip was dragged responsive to a selection of an insert command in a drop menu.

36. The method of claim 33, wherein the new timeline representation of the new media clip overwrites timeline representations of media clips at the location in the timeline display where the new media clip was dragged responsive to a selection of an overwrite command in a drop menu.

37. The computer program product of claim 9, wherein the timeline further comprises a playhead that indicates which frame is being viewed in the canvas.

38. The computer program product of claim 37, wherein dragging the playhead scrubs the project in the canvas or jumps to a particular point in time in the project in the canvas.

39. The computer program product of claim 9, wherein the timeline further comprises an in marker and an out marker that indicate a play range.

40. The computer program product of claim 39, wherein dragging the in marker changes an in point of the project, and wherein dragging the out marker changes an out point of the project.

41. The computer program product of claim 9, wherein a width of the timeline represents an entire duration of the project.

42. The computer program product of claim 10, wherein an editable timeline representation of a media clip is editable by trimming the media clip.

43. The computer program product of claim 10, wherein an editable timeline representation of a media clip is editable by moving the media clip within the timeline.

44. The computer program product of claim 10, wherein an editable timeline representation of a media clip is editable by slipping the media clip within the timeline.

45. The computer program product of claim 9, wherein the computer program code for displaying the timeline further comprises, responsive to a new media clip being dragged into the timeline, computer program code for displaying a new timeline representation of the new media clip.

46. The computer program product of claim 45, wherein the new timeline representation of the new media clip is composited at the location in the timeline display where the new media clip was dragged responsive to a selection of a composite command in a drop menu.

47. The computer program product of claim 45, wherein the new timeline representation of the new media clip is inserted at the location in the timeline display where the new media clip was dragged responsive to a selection of an insert command in a drop menu.

48. The computer program product of claim 45, wherein the new timeline representation of the new media clip overwrites timeline representations of media clips at the location in the timeline display where the new media clip was dragged responsive to a selection of an overwrite command in a drop menu.

\* \* \* \* \*

UNITED STATES PATENT AND TRADEMARK OFFICE
CERTIFICATE OF CORRECTION

| | | |
|---|---|---|
| PATENT NO. | : 7,805,678 B1 | Page 1 of 1 |
| APPLICATION NO. | : 10/826429 | |
| DATED | : September 28, 2010 | |
| INVENTOR(S) | : Gregory Niles et al. | |

It is certified that error appears in the above-identified patent and that said Letters Patent is hereby corrected as shown below:

In column 6, line 51, after "return to" insert -- the --.

Signed and Sealed this
Fifteenth Day of November, 2011

David J. Kappos
*Director of the United States Patent and Trademark Office*